(12) United States Patent
Rofougaran

(10) Patent No.: US 8,717,974 B2
(45) Date of Patent: *May 6, 2014

(54) HANDHELD COMPUTING UNIT COORDINATION OF FEMTOCELL AP FUNCTIONS

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 825 days.

This patent is subject to a terminal disclaimer.

(21) Appl. No.: 12/495,298

(22) Filed: Jun. 30, 2009

(65) Prior Publication Data
US 2009/0264125 A1 Oct. 22, 2009

Related U.S. Application Data

(63) Continuation-in-part of application No. 12/026,681, filed on Feb. 6, 2008.

(51) Int. Cl.
| | |
|---|---|
| *G06F 15/16* | (2006.01) |
| *G06F 15/177* | (2006.01) |
| *G06F 15/173* | (2006.01) |
| *H04B 7/00* | (2006.01) |
| *H04W 4/00* | (2009.01) |
| *H04M 11/00* | (2006.01) |
| *H04W 84/04* | (2009.01) |
| *H04W 88/08* | (2009.01) |
| *H04W 88/12* | (2009.01) |

(52) U.S. Cl.
CPC ............ *H04W 84/045* (2013.01); *H04W 88/08* (2013.01); *H04W 88/12* (2013.01)
USPC ........ 370/328; 370/310; 455/403; 455/422.1; 709/208; 709/220; 709/221; 709/222; 709/223; 709/224

(58) Field of Classification Search
CPC .... H04W 88/08; H04W 88/12; H04W 84/045
USPC ........ 370/310, 328; 455/403, 422.1; 709/208, 709/220, 221, 222, 223, 224
See application file for complete search history.

(56) References Cited

U.S. PATENT DOCUMENTS

| | | |
|---|---|---|
| 4,807,183 A | 2/1989 | Kung |
| 5,502,683 A | 3/1996 | Marchioro |

(Continued)

FOREIGN PATENT DOCUMENTS

| | | |
|---|---|---|
| EP | 1499070 A2 | 1/2005 |
| WO | 2009002464 A2 | 12/2008 |

OTHER PUBLICATIONS

Bruce K Gale, "RF, Electrical, and Magnetic Microsystems," date unknown, 8 pages.

(Continued)

*Primary Examiner* — Ayaz Sheikh
*Assistant Examiner* — Tarell Hampton
(74) *Attorney, Agent, or Firm* — Garlick & Markison

(57) ABSTRACT

A handheld computing unit includes a processing module and a plurality of PHY units. The processing module determines whether a femtocell access point (AP) mode is active. When the femtocell AP mode is active, the processing module determines whether at least one other handheld computing unit is supporting femtocell AP operations. When another handheld computing unit is not supporting the femtocell AP operations, the processing module enables the femtocell AP operations. A PHY unit of the plurality of PHY units converts a downstream PHY signal into a downstream radio frequency (RF) signal and converts an upstream RF signal into an upstream PHY signal.

20 Claims, 15 Drawing Sheets

(56) References Cited

U.S. PATENT DOCUMENTS

| | | |
|---|---|---|
| 5,754,948 A | 5/1998 | Metze |
| 5,786,912 A | 7/1998 | Kartalopoulos |
| 5,809,321 A | 9/1998 | Hansen |
| 5,884,104 A | 3/1999 | Chase |
| 6,182,203 B1 | 1/2001 | Simar |
| 6,234,900 B1 | 5/2001 | Cumbers |
| 6,438,622 B1 | 8/2002 | Haghighi et al. |
| 6,500,070 B1 | 12/2002 | Tomizawa et al. |
| 6,663,295 B2 | 12/2003 | Kami et al. |
| 6,735,663 B2 | 5/2004 | Watts, Jr. et al. |
| 6,735,708 B2 | 5/2004 | Watts, Jr. |
| 6,801,974 B1 | 10/2004 | Watts, Jr. et al. |
| 6,816,925 B2 | 11/2004 | Watts, Jr. |
| 7,065,326 B2 | 6/2006 | Lovberg |
| 7,082,285 B2 | 7/2006 | Linde |
| 7,149,837 B2 | 12/2006 | Watts, Jr. et al. |
| 7,159,099 B2 | 1/2007 | Lucas |
| 7,171,050 B2 | 1/2007 | Kim |
| 7,197,584 B2 | 3/2007 | Huber et al. |
| 7,218,143 B1 | 5/2007 | Young |
| 7,257,093 B1 | 8/2007 | Witzke |
| 7,330,702 B2 | 2/2008 | Chen et al. |
| 7,406,062 B2 | 7/2008 | Hsu |
| 7,444,393 B2 | 10/2008 | Chung |
| 7,903,724 B2 | 3/2011 | Rofougaran |
| 7,929,474 B2 | 4/2011 | Pettus |
| 2002/0022521 A1 | 2/2002 | Idaka |
| 2002/0049806 A1 | 4/2002 | Gatz et al. |
| 2002/0061012 A1 | 5/2002 | Thi |
| 2002/0107010 A1 | 8/2002 | Witte |
| 2002/0164945 A1 | 11/2002 | Olsen |
| 2003/0001882 A1 | 1/2003 | Macer et al. |
| 2003/0017845 A1 | 1/2003 | Doviak |
| 2003/0040284 A1 | 2/2003 | Sato |
| 2003/0059022 A1 | 3/2003 | Nebiker |
| 2003/0078071 A1 | 4/2003 | Uchimyama |
| 2003/0112585 A1 | 6/2003 | Silvester |
| 2003/0126335 A1 | 7/2003 | Silvester |
| 2003/0128712 A1 | 7/2003 | Moriwaki |
| 2003/0162503 A1 | 8/2003 | LeCren |
| 2003/0172380 A1 | 9/2003 | Kikinis |
| 2003/0221036 A1 | 11/2003 | Konetski |
| 2004/0054776 A1 | 3/2004 | Klotz |
| 2004/0062308 A1 | 4/2004 | Kamosa |
| 2004/0117442 A1 | 6/2004 | Thielen |
| 2004/0123113 A1 | 6/2004 | Mathiassen et al. |
| 2004/0153863 A1 | 8/2004 | Klotz |
| 2004/0157559 A1 | 8/2004 | Sugikawa |
| 2004/0174431 A1 | 9/2004 | Stienstra |
| 2004/0203364 A1 | 10/2004 | Silvester |
| 2004/0266336 A1 | 12/2004 | Patsiokas et al. |
| 2005/0014468 A1 | 1/2005 | Salokannel |
| 2005/0060598 A1 | 3/2005 | Klotz |
| 2005/0124307 A1 | 6/2005 | Ammar et al. |
| 2005/0185364 A1 | 8/2005 | Bell |
| 2005/0250531 A1 | 11/2005 | Takebe et al. |
| 2006/0026348 A1 | 2/2006 | Wallace |
| 2006/0038731 A1 | 2/2006 | Turner |
| 2006/0046762 A1 | 3/2006 | Yoon et al. |
| 2006/0085675 A1 | 4/2006 | Popell |
| 2006/0101164 A1 | 5/2006 | Lee |
| 2006/0148568 A1 | 7/2006 | Schultz et al. |
| 2006/0164271 A1 | 7/2006 | Hirt |
| 2006/0167784 A1 | 7/2006 | Hoffberg |
| 2006/0176851 A1 | 8/2006 | Bennett |
| 2006/0190691 A1 | 8/2006 | Chauve |
| 2006/0203758 A1 | 9/2006 | Tee et al. |
| 2006/0252470 A1 | 11/2006 | Seshadri |
| 2006/0260546 A1 | 11/2006 | Usami |
| 2006/0262026 A1 | 11/2006 | Gainey et al. |
| 2006/0269004 A1 | 11/2006 | Ibrahim |
| 2006/0282635 A1 | 12/2006 | Mather |
| 2007/0015558 A1 | 1/2007 | Zalewski et al. |
| 2007/0038808 A1 | 2/2007 | Yim |
| 2007/0147152 A1 | 6/2007 | Sekiguchi |
| 2007/0155390 A1* | 7/2007 | Kodikara Patabandi et al. ............. 455/450 |
| 2007/0155502 A1 | 7/2007 | Wu |
| 2007/0167149 A1 | 7/2007 | Comstock |
| 2007/0229270 A1 | 10/2007 | Rofougaran |
| 2007/0239929 A1 | 10/2007 | Chen |
| 2007/0268481 A1 | 11/2007 | Raskar et al. |
| 2007/0298882 A1 | 12/2007 | Marks et al. |
| 2008/0020843 A1 | 1/2008 | Wolinsky |
| 2008/0028118 A1 | 1/2008 | Sayers et al. |
| 2008/0040541 A1 | 2/2008 | Brockmann |
| 2008/0063236 A1 | 3/2008 | Ikenoue et al. |
| 2008/0070516 A1 | 3/2008 | Lee |
| 2008/0076406 A1 | 3/2008 | Chen |
| 2008/0151847 A1 | 6/2008 | Abujbara |
| 2008/0244148 A1* | 10/2008 | Nix et al. ............. 710/313 |
| 2009/0006640 A1 | 1/2009 | Brouwer |
| 2009/0198854 A1 | 8/2009 | Rofougaran |
| 2009/0215533 A1 | 8/2009 | Zalewski et al. |
| 2010/0056132 A1* | 3/2010 | Gallagher ............. 455/422.1 |
| 2010/0120447 A1 | 5/2010 | Anderson et al. ......... 455/456.1 |
| 2010/0146199 A1 | 6/2010 | Shaeffer |
| 2010/0273468 A1* | 10/2010 | Bienas et al. ............. 455/418 |
| 2011/0134868 A1* | 6/2011 | Lee et al. ............. 370/329 |

OTHER PUBLICATIONS

Dr. Lynn Fuller, "Microelectromechanical Systems (MEMs) Applications—Microphones," Rochester Institute of Technology Microelectronic Engineering, Apr. 25, 2005, pp. 1-43.

Radio Control Adapter; IBM Technical Disclosure Bulletin NN86081337; IBM; Aug. 1986.

Xilinx Inc.: Spartan-3AN FPGA Family Data Sheet, DS557, June 2, 2008, pp. 5.

Haworth, et al.; Public Security Screening for Metallic Objects with Millimetre-Wave Images; Heriot-Watt University; United Kingdom; pp. 1-4, Jun. 2005.

Elsadek, et al.; "A Compact 3-D Microwave Holographic Pointer System Using a Size Reduced Microstrip Planar Array"; Department of Electrical and Computer Engineering; University of California; pp. 1-5, 2001.

Elsadek, et al.; "Microstrip Multi-element Diversity Antenna Array for Three Dimensional Microwave Holographic Input Pointer (Holo3D)"; Department of Electrical and Computer Engineering; University of California; pp. 1-4, 2002.

E3 Wii Controller; Nintendo Wilmote; Technology Limitations; Xgaming, Inc.; pp. 1-5, 2006.

* cited by examiner

HANDHELD COMPUTING UNIT COORDINATION OF FEMTOCELL AP FUNCTIONS

This patent application is claiming priority under 35 USC §120 as a continuation in part patent application of co-pending patent application entitled COMPUTING DEVICE WITH HANDHELD AND EXTENDED COMPUTING UNITS, having a filing date of Feb. 6, 2008, and a Ser. No. 12/026,681.

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Technical Field of the Invention

This invention relates generally to communication systems and more particularly to computing devices used in such communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, IEEE 802.11, IEEE 802.15.4, Bluetooth, global system for mobile communications (GSM), wideband code division multiplexing (WCDMA), enhanced data rates for GSM evolution (EDGE), universal mobile telecommunications system (UMTS), long term evolution (LTE), IEEE 802.16, evolution data optimized (EV-DO), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

An issue arises for indirect wireless communications when one or more of the wireless communication devices are indoors. In this instance, the structure of a building impedes wireless transmissions, which decreases the wireless communication device's ability to communication with a base station or access point. To address this issue, the wireless communication industry is creating standards for the deployment of femtocells. In general, a femtocell is a small cellular base station designed for in-building use that connects to the core mobile network via the internet. A typical femtocell supports a small number of users (e.g., 2-6 cell phones).

As femtocells are introduced to the market, there are many deployment challenges. One challenge is producing economical femtocells. Another challenge is the portability of femtocells. For example, the size and transportability of a femtocell are issues that affect the ability to easily use a femtocell at various locations (home, office, on vacation, etc.). Other challenges include processing of cellular telephone calls, interference, multiple units in overlapping femtocell coverage areas, etc.

Therefore, a need exists for a computing unit that includes femtocell functionality and that addresses one or more of the above challenges and/or other femtocell technological challenges and/or deployment challenges.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
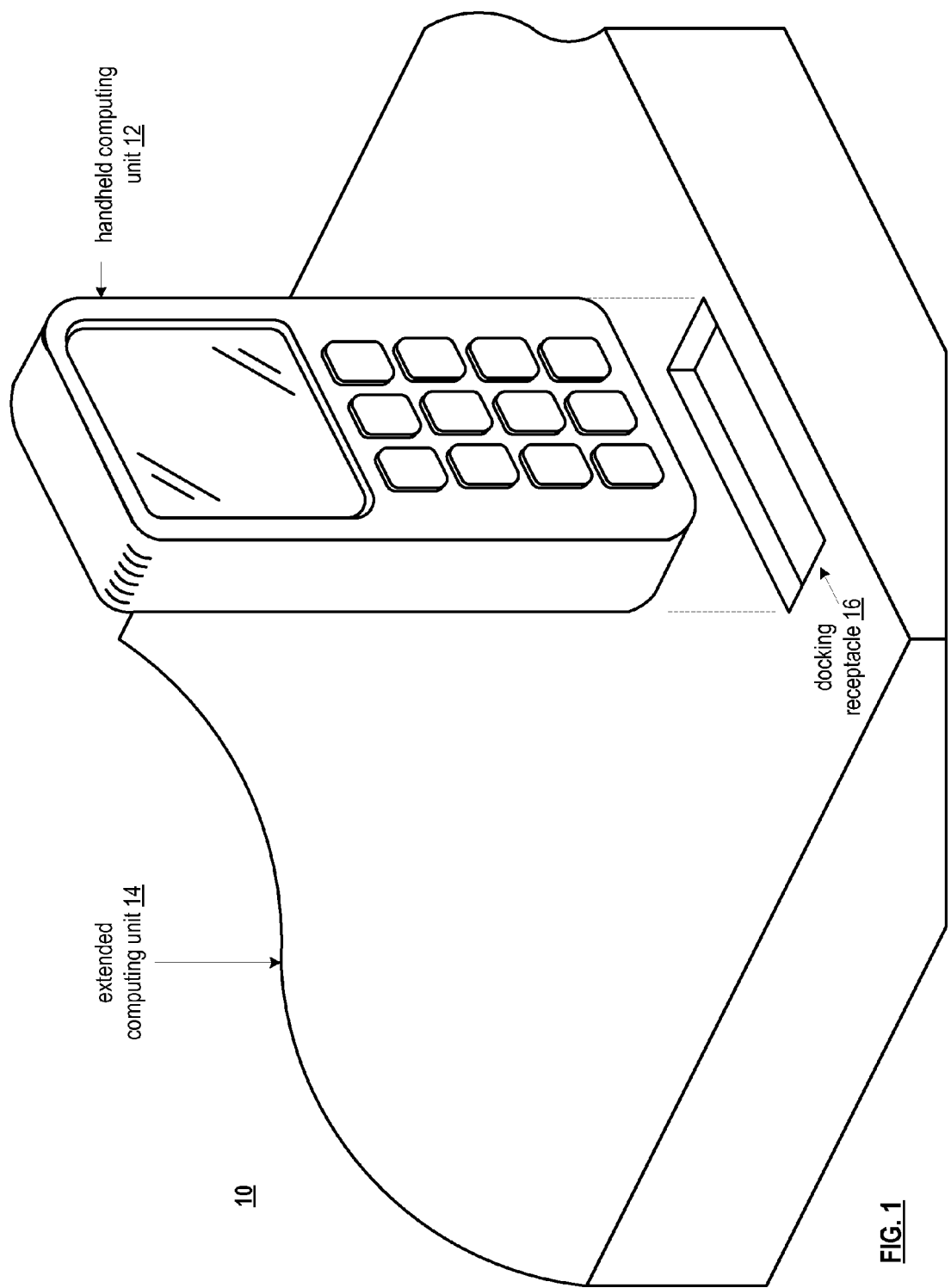
FIG. 1 is a block diagram of an embodiment of a computing device in accordance with the present invention.

FIG. 1 is a diagram of an embodiment of a computing device 10 that includes a handheld computing unit 12 and an extended computing unit 14. The handheld computing unit 12 may have a form factor similar to a cellular telephone, personal digital assistant, personal digital audio/video player, etc. and includes a connector structure that couples to a docketing receptacle 16 of the extended computing unit 14 (e.g., a docking interface). The connector structure and docketing receptacle may be wired (e.g., male and female connectors), wireless transceivers (e.g., Bluetooth, ZigBee, 60 GHz, etc.), and/or magnetic coils.

In general, the handheld computing unit 12 includes the primary processing module (e.g., central processing unit), the primary main memory, and the primary hard disk memory for the computing device 10. In this manner, the handheld computing unit 12 functions as the core of a personal computer (PC) or laptop computer when it is docked to the extended computing unit and functions as a cellular telephone, a GPS receiver, a personal digital audio player, a personal digital video player, a personal digital assistant, and/or other handheld electronic device when it is not docked to the extended computing unit. Further, the handheld computing unit 12 may function as a femtocell access point (AP) as will be discussed below with reference to FIGS. 2-15 when it is docked to the extended computing unit 14 and when it is not docked.

In addition, when the handheld computing unit 12 is docked to the extended computing unit 14, files and/or applications can be swapped therebetween. For example, assume that the user of the computing device 10 has created a presentation using presentation software and both reside in memory of the extended computing unit 14. The user may elect to transfer the presentation file and the presentation software to memory of the handheld computing unit 12. If the handheld computing unit 12 has sufficient memory to store the presentation file and application, then it is copied from the extended computing unit memory to the handheld computing unit memory. If there is not sufficient memory in the handheld computing unit, the user may transfer an application and/or file from the handheld computing unit memory to the extended computing unit memory to make room for the presentation file and application.

With the handheld computing unit 12 including the primary components for the computing device 10, there is only one copy of an application and/or of a file to support PC functionality, laptop functionality, and a plurality of handheld device functionality (e.g., TV, digital audio/video player, cell phone, PDA, GPS receiver, etc.). In addition, since only one copy of an application and/or of a file exists (other than desired backups), special software to transfer the applications and/or files from a PC to a handheld device is no longer needed. As such, the processing module, main memory, and I/O interfaces of the handheld computing unit 12 provide a single core architecture for a PC and/or a laptop, a cellular telephone, a PDA, a GPS receiver, a personal digital audio player, a personal digital video player, etc.

Figure 2:
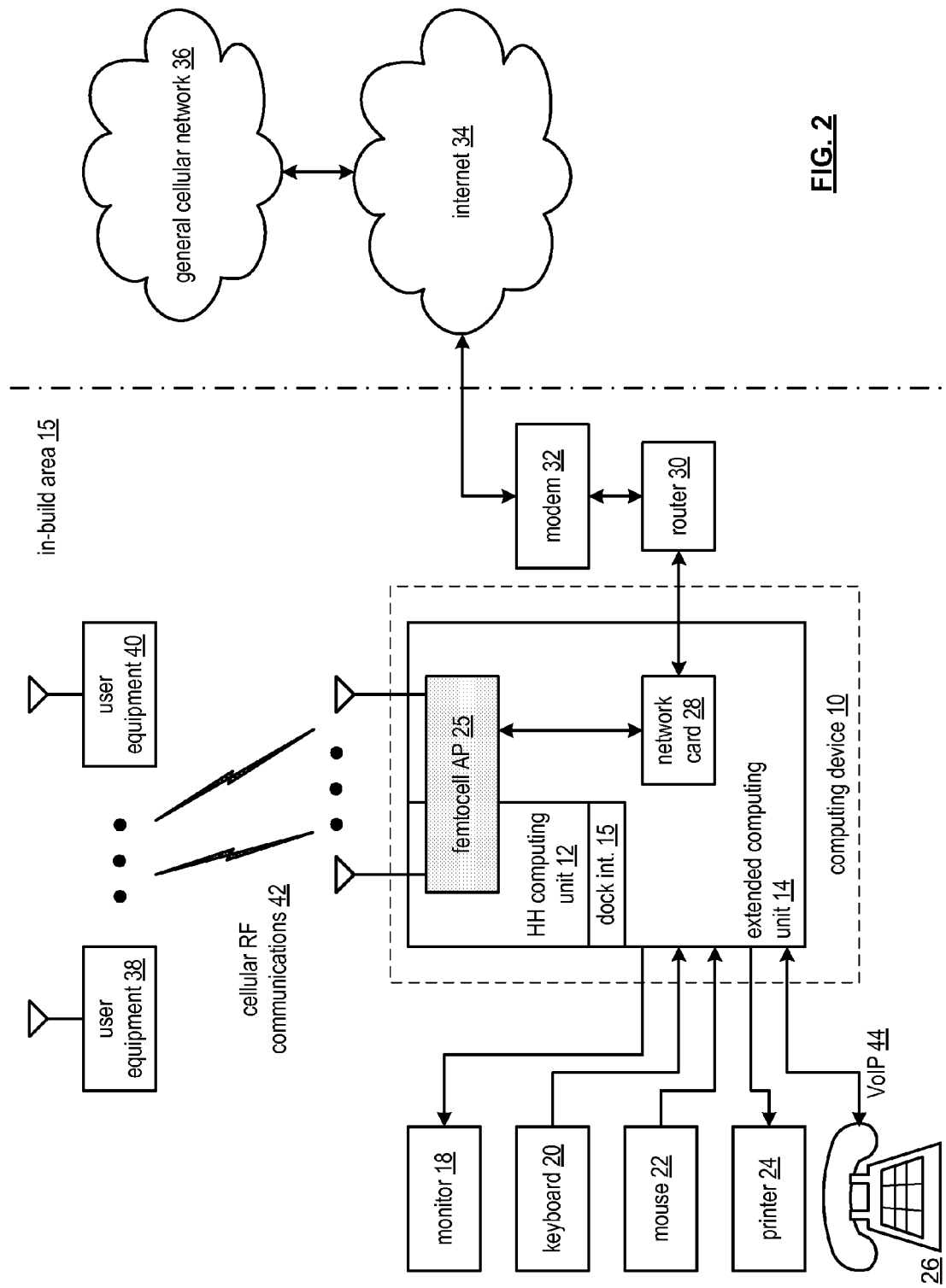
FIG. 2 is a schematic block diagram of an embodiment of a computing device in accordance with the present invention.

FIG. 2 is a schematic block diagram of an embodiment of a computing device 10 that includes a handheld computing unit 12 coupled to an extended computing unit 14 via a docking interface 15. The extended computing unit 14 is coupled to one or more of a monitor 18, a keyboard 20, a mouse 22, a printer 24, and a voice over internet protocol (VoIP) phone 26 via one or more conventional interconnections. The extended computing unit 14 includes a network card 28 that is coupled to a modem 32 (e.g., DSL or cable) directly or via a router 30. Note that in another embodiment the modem could be wireless and/or the router could be wireless. The modem 32 is coupled to the internet 34, which is coupled to a general cellular network 36 (e.g., public switched telephone network, mobile core network for GSM, WCDMA, EDGE, UMTS, LTE, etc.). As such, the network card 28 may be coupled to the general cellular network 36 via a wired and/or wireless connection.

The handheld (HH) computing unit 12 and the extended (EXT) computing unit 14 collectively function as a femtocell access point (AP) 25 to support two or more user equipment 38-40 (e.g., a cellular telephone, push to talk radio, etc.). In this instance, the femtocell AP 25 communicates with the general cellular network 36 via the network card 28, the modem 32, and the internet 34. The femtocell AP 25 functions in accordance with standards specifications including the 3GPP (third generation partnership project) TR 25.xxx specifications for 3G (third generation) systems (e.g., WCDMA) and/or 3GPP TR 45.xxx specifications for GSM systems (e.g., GSM, EDGE, etc.) to support cellular communications of the user equipment 38-50.

The general cellular network 36 may send the femtocell AP 25 a downstream control network (CN) signal in accordance with the standards specifications. The femtocell AP 25 may send the general cellular network 36 an upstream control network (CN) signal in accordance with the standards specifications. A local network may couple the modem 32 to the femtocell AP 25. For example, the router 30 may be a wireless router and together with a compatible local wireless interface in the femtocell AP 25 form the local network.

A network interface module may convert the downstream control network signal from the general cellular network 36 into a downstream local network signal to be sent to the femtocell AP 25. The network interface module may be included in the modem 32, the router 30, the network card 28, and/or the femtocell AP 25. The network interface module may convert an upstream local control signal from the femtocell AP 25 into the upstream control network (CN) signal to be sent to the general cellular network 36.

Figure 3:
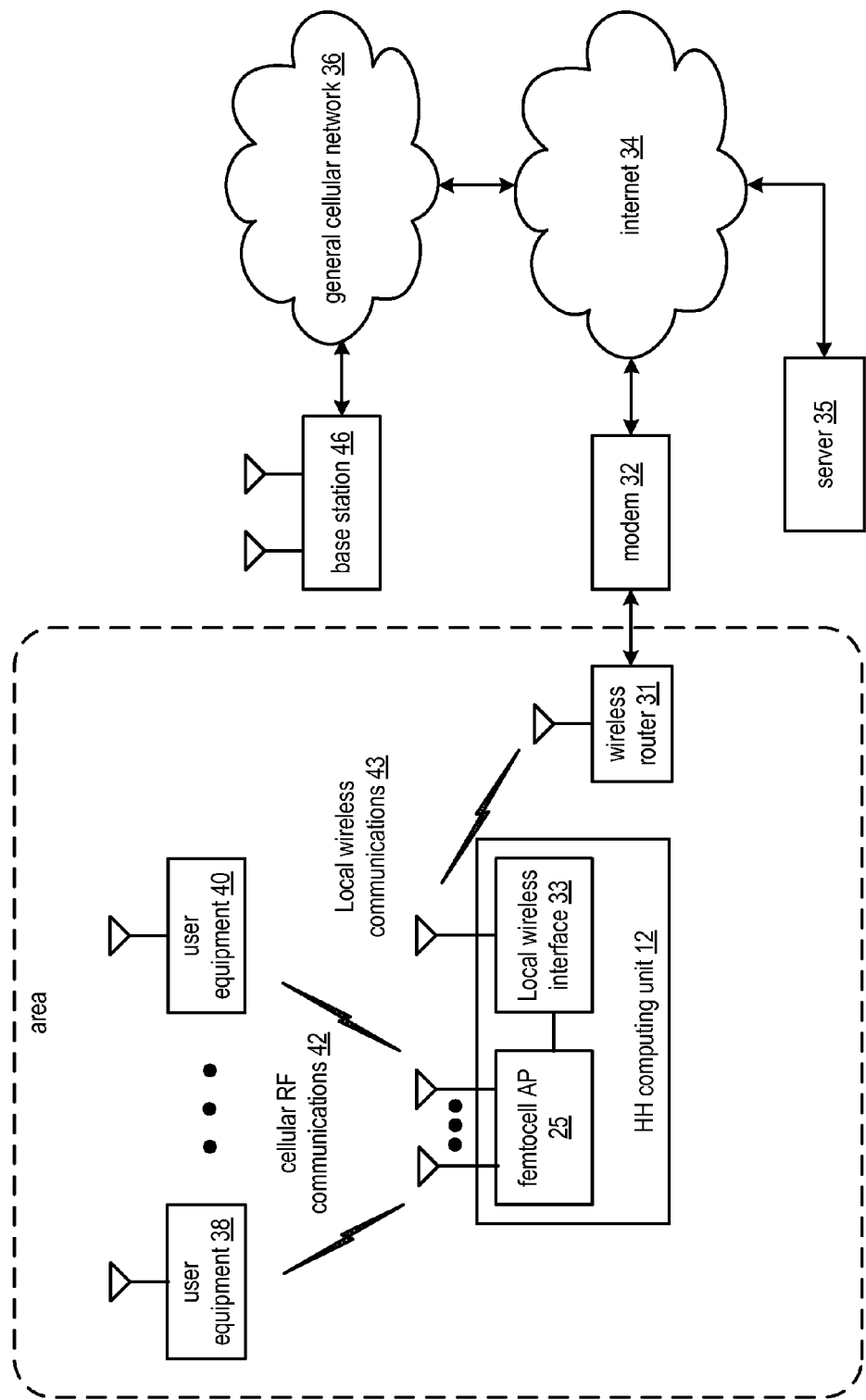
FIG. 3 is a schematic block diagram of an embodiment of a handheld computing unit implementing a femtocell AP in accordance with the present invention.

FIG. 3 is a schematic block diagram of an embodiment of a handheld computing unit 12 implementing a femtocell AP 25 within an area. An area may be a two-dimensional or three-dimensional space that is pre-defined or determined. For example, the area may be predefined as all the space within a building, or the space within one or more floors of the building, or the space of a portion of the floor of the building. The determined space may represent an area that the HH computing unit 12 is capable of supporting femtocell coverage. The particular area may be predetermined and programmed (e.g., the HH computing unit includes a GPS receiver to determine its location, when the location corresponds to the programmed area, the HH computing unit enables its femtocell AP functions) or it may be randomly determined (e.g., weak or no signal detected from a basestation).

In an example of operation, the handheld computing unit 12 enters the area and determines that a femtocell AP mode is not active for the geographic area. In other words, no femtocell AP 25 is active for this area (e.g., no femtocell signals are present). The HH computing unit 12 may establish an active femtocell AP mode for the geographic area.

The handheld (HH) computing unit 12 provides femtocell AP functions to support one or more of the user equipment 38-40 in accordance with one or more femtocell protocols (e.g., 3GPP TR 25.xxx specifications for 3G systems (e.g., WCDMA) and/or 3GPP TR 45.xxx specifications for GSM systems (e.g., GSM, EDGE, etc.)). In this mode, the HH computing unit 12 communicates with the general cellular network 36 via the internet 34, the modem 32, and the wireless router 31. To facilitate such communications, the HH computing unit includes a local wireless interface 33 that communicates local wireless communications 43 with the wireless router 31.

For example, a network interface module (included in the wireless router 31 or modem 32) converts the downstream control network signal from the general cellular network 36 into a downstream local network signal to be sent to the femtocell AP 25. The wireless router 31 converts the downstream local network signal into a downstream local network radio frequency (RF) signal for transmission. The local wireless interface module 33 converts a downstream local network radio frequency (RF) signal into the downstream CN signal.

The local wireless interface module 33 also receives an upstream CN signal from the femtocell AP 25 and converts it into an upstream local network RF signal that is transmitted to the wireless router 31. The wireless router 31 converts the upstream local network RF signal into an upstream local network signal. The network interface module (included in the wireless router 31 or modem 32) converts the upstream local control signal into an upstream control network (CN) signal to be sent to the general cellular network 36.

Further, the HH computing unit 12 communicates with one or more of the user equipment 38-40 via cellular RF communications 42 in accordance with the one or more femtocell protocols. For instance, user equipment 38-40 registers with the general cellular network 36 through the HH computing unit 12 and communicates voice and data calls through the HH computing unit 12 to participate in cellular communications. The femtocell AP 25 operates in a similar fashion as a regular cellular base station 46 such that the user equipment 38-40 follows the same protocols.

In a stand-alone femtocell AP mode, the HH computing unit 12 is battery operated. As such, it has a finite amount of energy to perform the femtocell AP role. When the HH computing unit has sufficient energy, it solely performs the femtocell AP role in a normal manner (e.g., conventional power savings techniques are used). In this state, handheld computing unit 12 performs the femtocell AP role by converting upstream user equipment signals into local wireless interface upstream signals (e.g., signals from the user equipment 38-40 to the network 36) and by converting local wireless interface downstream signals into downstream user equipment signals (e.g., signals from the network 36 to the user equipment 38-40).

When the energy of the HH computing unit 12 is less than sufficient, the HH computing unit 12 executes an energy adjustment algorithm. For example, less than sufficient energy may be indicated by a battery charge state (e.g., current capacity) that is at a level, which is inadequate to power the current energy demand for a given duration. As another example, less than sufficient energy may be based on the battery capacity (e.g., how much energy the battery has when it is fully charged), a desired duration of operation, and the energy demand for the various operations to be executed by the HH computing unit. As a specific example of this, assume that it is desired to support femtocell AP operations and other handheld operations (e.g., user applications) for a duration of 120 minutes. If the energy demand for these operations will exhaust the fully charged battery in 90 minutes, then the energy is less than sufficient.

When the HH computing unit 12 is in a master role and has less than sufficient energy to support full support the femtocell AP operations (e.g., core network interface, radio network controller, medium access control of radio interfaces, and radio resource controller) and one or more other HH computing units are available and capable of femtocell AP functionality, it may off-load a femtocell AP operation or a subset thereof (e.g., femtocell AP functions of a femtocell AP operation) to the other HH computing unit(s). In this state, the HH computing unit 12 may determine to offload femtocell AP operations or subsets thereof based on a predetermination distribution of femtocell AP functions, a capability (e.g., RF band support for various user equipment 38-40), or other basis to optimize femtocell operations in an area.

Figure 4:
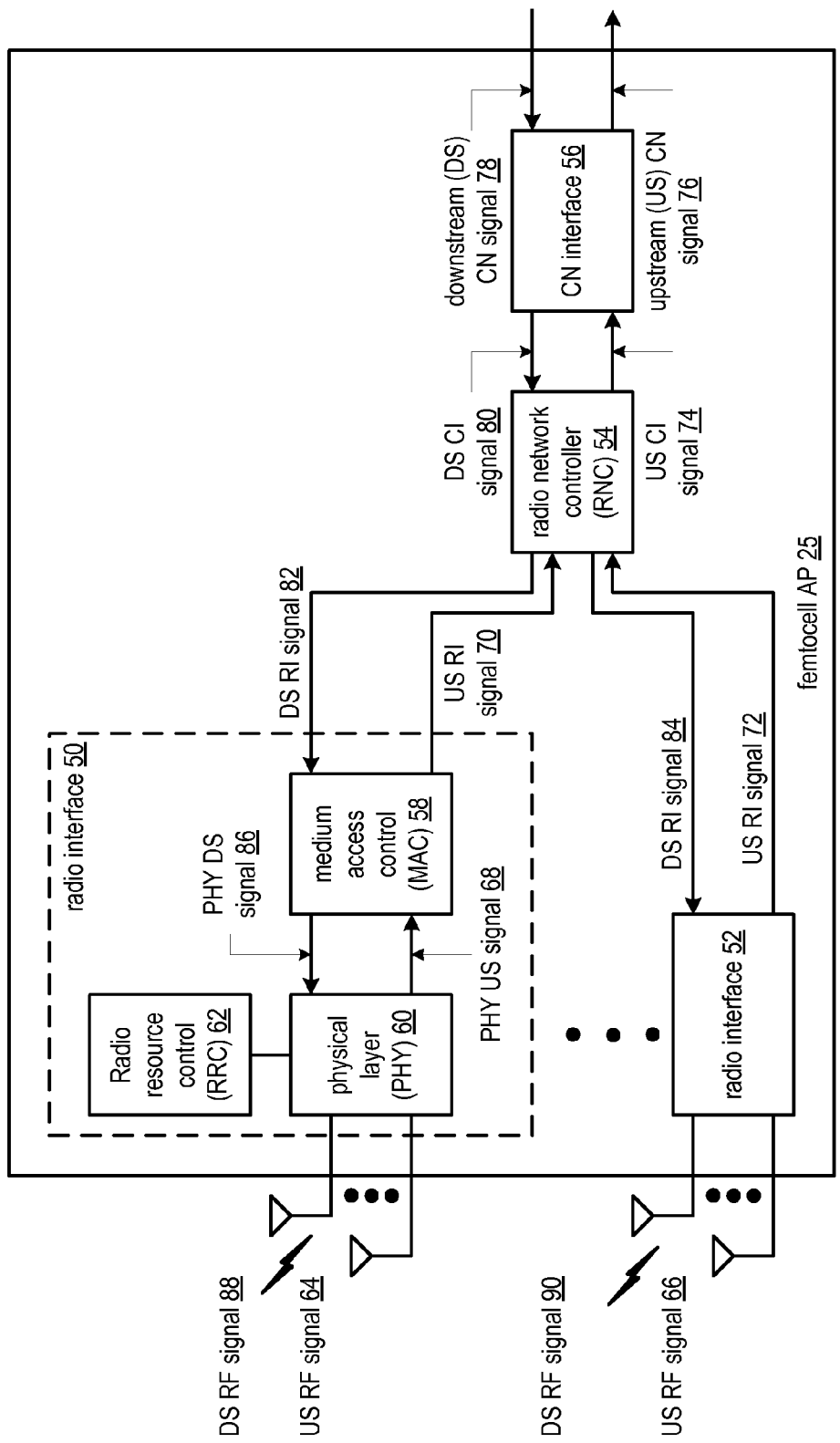
FIG. 4 is a schematic block diagram of an embodiment of a femtocell access point (AP) in accordance with the present invention.

FIG. 4 is a schematic block diagram of an embodiment of a femtocell access point (AP) 25 that includes a plurality of radio interfaces 50-52, a local radio network controller (RNC) 54, and a core network (CN) interface 56. Each of the radio interfaces 50-52 includes a medium access control (MAC) unit 58, a physical layer (PHY) unit 60, and a radio resource controller (RRC) 62.

In an example of operation, the CN interface 56 receives the downstream (DS) CN signal 78 from an upstream network component (e.g., the general cellular network 36 via the local wireless interface 33). The DS CN signal 78 is formatted in accordance with an internet protocol (IP) transmission scheme (e.g., TCP/IP, etc.). The content of the DS CN signal 78 includes user data and/or system data that are formatted in accordance with a particular cellular telephone interface protocol (e.g., 3GPP TS 25.410 UTRAN Iu Interface: General Aspects and Principles and other specifications referenced therein). The user data may be cellular network packets, or frames, of voice, text, data, video, audio, etc. The system data may include data for registering user equipment, resource allocation, resource management, etc. and is in accordance with one or more femtocell protocols (e.g., 3GPP TS 25.401 UTRAN overall description and specifications reference therein).

The CN interface 56 converts the DS CN signal 78 into a downstream (DS) CN interface (CI) signal 80. For example, the CN interface 56 recovers the content of the DS CN signal 78 by removing the IP transmission scheme overhead information. The CN interface provides the recovered DS CI signal 80 to the radio network controller (RNC) 54. Note that, in an embodiment, the CN interface 56 and the RNC 54 may collectively function as a HNB (Home Node B gateway). Further note that the CN interface operation is a separate operation that a master HH computing unit may off-load to another HH unit or may be distributed among multiple HH computing units when the units are in a distributed femtocell AP implementation mode.

The RNC 54 converts the DS CI signal 80 into one or more downstream (DS) radio interface (RI) signals 82-84. For instance, if the DS CI signal 80 includes user data and/or system data for more than one radio interface 50-52, then the RNC 54 partitions the signal for the respective radio interfaces 50-52. In general, the femtocell AP operation of RNC 54 includes the functions of radio resource management, mobility management, and/or encryption/decryption of data to/from the user equipment 38-40. Radio resource management further includes the functions of outer loop power control, load control, admission control, packet scheduling, handover control, macro-diversity combining, securing functions, and/or mobility management for user equipment within the femtocell APs coverage area. Note that each of these RNC functions and sub-functions are separate functions that a master HH computing unit may off-load to another HH unit or may be distributed among multiple HH computing units when the units are in a distributed femtocell AP implementation mode.

The MAC unit 58 receives the DS RI signal 82 and converts it into a physical layer (PHY) downstream (DS) signal 86. This may be done in accordance with one or more femtocell protocols. For example, the MAC unit 58 may convert the DS RI signal 82 into the PHY DS signal 86 in accordance with the 3GPP TS 25.301: Radio Interface Protocol Architecture. Note that each MAC unit 58 is a separate function that a master HH computing unit may off-load to another HH unit or may be distributed among multiple HH computing units when the units are in a distributed femtocell AP implementation mode.

The PHY unit 60 converts the PHY DS signal 86 into a downstream (DS) user equipment (UE) radio frequency (RF) signal 88 in accordance with one or more femtocell protocols. For example, the PHY unit 60 may convert the PHY DS signal 86 into the DS UE RF signal 88 in accordance with the 3GPP TS 25.301: Radio Interface Protocol Architecture. Note that the PHY unit 60 includes a baseband processing module and an RF section.

Within a radio interface, the radio resource control (RRC) unit 62 provides network layer functionality for the radio interface 50-52. For example, the RRC unit 62 may process one or more of broadcast information related to non-access stratum, broadcast information related to access stratum, processing of an RRC connection, processing of radio bearers, processing radio resources for the RRC connection, performing RRC connection mobility functions, controlling requested quality of service, power control, processing initial cell selection and cell re-selection, arbitration of the radio resources on an uplink dedicate channel, RRC message integrity protection, cell broadcast service control, and multimedia broadcast multicast service control. Note that processing includes one or more of establishing, maintaining, reconfiguring, and releasing. Further note that functions performed by the RRC unit may be in accordance with one or more femtocell specifications (e.g., 3GPP TS 25.301: Radio Interface Protocol Architecture). Still further note that the RRC functions are separate functions that that a master HH computing unit may off-load to another HH unit or may be distributed among multiple HH computing units when the units are in a distributed femtocell AP implementation mode.

The PHY unit 60 also converts an upstream (US) user equipment (UE) RF signal 64 into a PHY US signal 68 in accordance with one or more femtocell protocols. The MAC unit 58 converts the PHY US signal 68 into a US RI signal 70 in accordance with one or more femtocell protocols (e.g., 3GPP TS 25.301: Radio Interface Protocol Architecture). Note that radio interface 52 converts a DS RI signal 84 into a DS UE RF signal 90 and converts a US UE RF signal 66 into a US RI signal 72 in a similar fashion as discussed with reference to radio interface 50.

The radio network controller (RNC) 54 converts the US RI signals 70-72 into a US CT signal 74 in accordance with one or more femtocell protocols (e.g., 3GPP TS 25.401 UTRAN overall description and specifications reference therein). The CN interface 56 converts the US CT signal 74 into a US CN signal 76. For example, the CN interface 56 formats the US CT signal 74 in accordance with an IP transmission scheme to produce the US CN signal 76. In an example, the CN interface 56 sends the US CN signal 76 to the general cellular network 36 via the local wireless interface 33. Note that the US CT signal 74 is formatted in accordance with a femtocell protocol (e.g., e.g., 3GPP TS 25.410 UTRAN Iu Interface: General Aspects and Principles and other specifications referenced therein).

Figure 5:
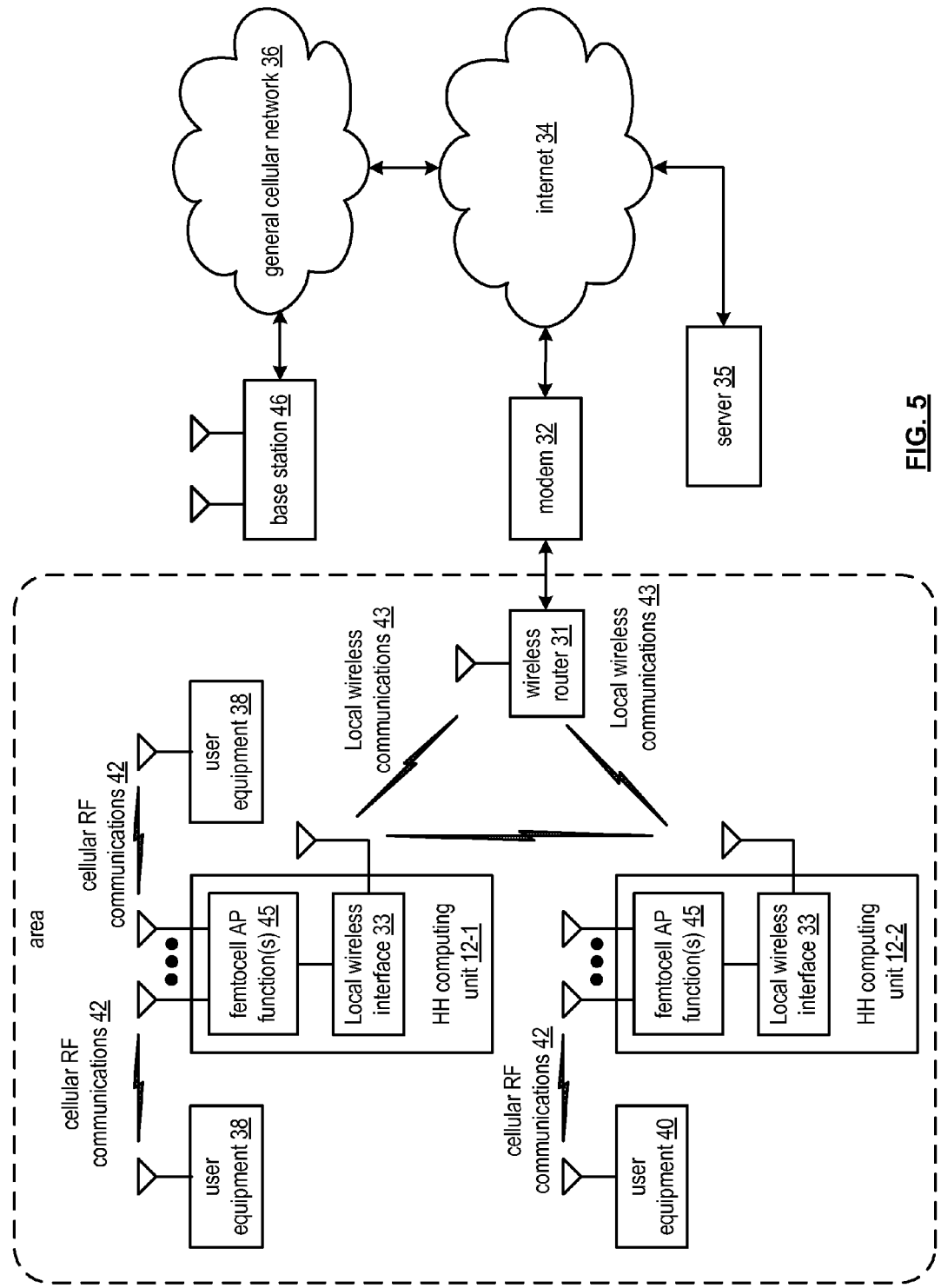
FIG. 5 is a schematic block diagram of an embodiment of multiple handheld computing units implementing a femtocell AP in accordance with the present invention.

FIG. 5 is a schematic block diagram of an embodiment of multiple handheld (HH) computing units 12-1 and 12-2 implementing the femtocell AP in an area. The HH computing units 12-1 and 12-2 may coordinate implementing the femtocell AP 25 by sharing execution of femtocell AP function(s) 45. For instance, the femtocell AP function(s) 45 of one of the HH computing units 12 may be configured to support all of the femtocell AP functions for the area, a portion of the functions, or none of the functions depending on the femtocell AP implementation mode. For example, when the femtocell AP implementation mode is master/slave mode, the femtocell AP function(s) 45 of the master HH computing unit (e.g., 12-2) may support the CN interface operation, the RNC operation, the RRC operations, and the MAC operations, while the other HH computing unit has no femtocell AP responsibilities. As another master-slave example, the master HH computing unit may off-load one or more the femtocell AP operations or functions thereof.

As another example, when the femtocell AP implementation mode is distributed, the HH computing units 12-1 through 12-2 share the femtocell AP operations or functions thereof. For instance, the HH computing units 12-1 and 12-2 may determine how to distribute the femtocell AP functions between them based on one or more of a predetermined distribution of functions based on a number of HH computing units in the area (e.g., lookup table), a quality of service basis to a user device (e.g., coverage, channel rates), available power (e.g., battery life of a HH computing unit), available processing resources (e.g., one HH computing unit may not have the correct RF resources in the femtocell AP 25 function to serve a particular class of user devices), available capacity of the local wireless communications 43 path to the general cellular network 36 via the wireless router 31 and modem 32, and/or any other factor that address efficiency and performance of the femtocell operations. In a specific example, HH computing unit 12-1 provides femtocell AP functionality to user equipment 38 and HH computing unit 12-2 provides femtocell AP functionality to user equipment 40.

Figure 6:
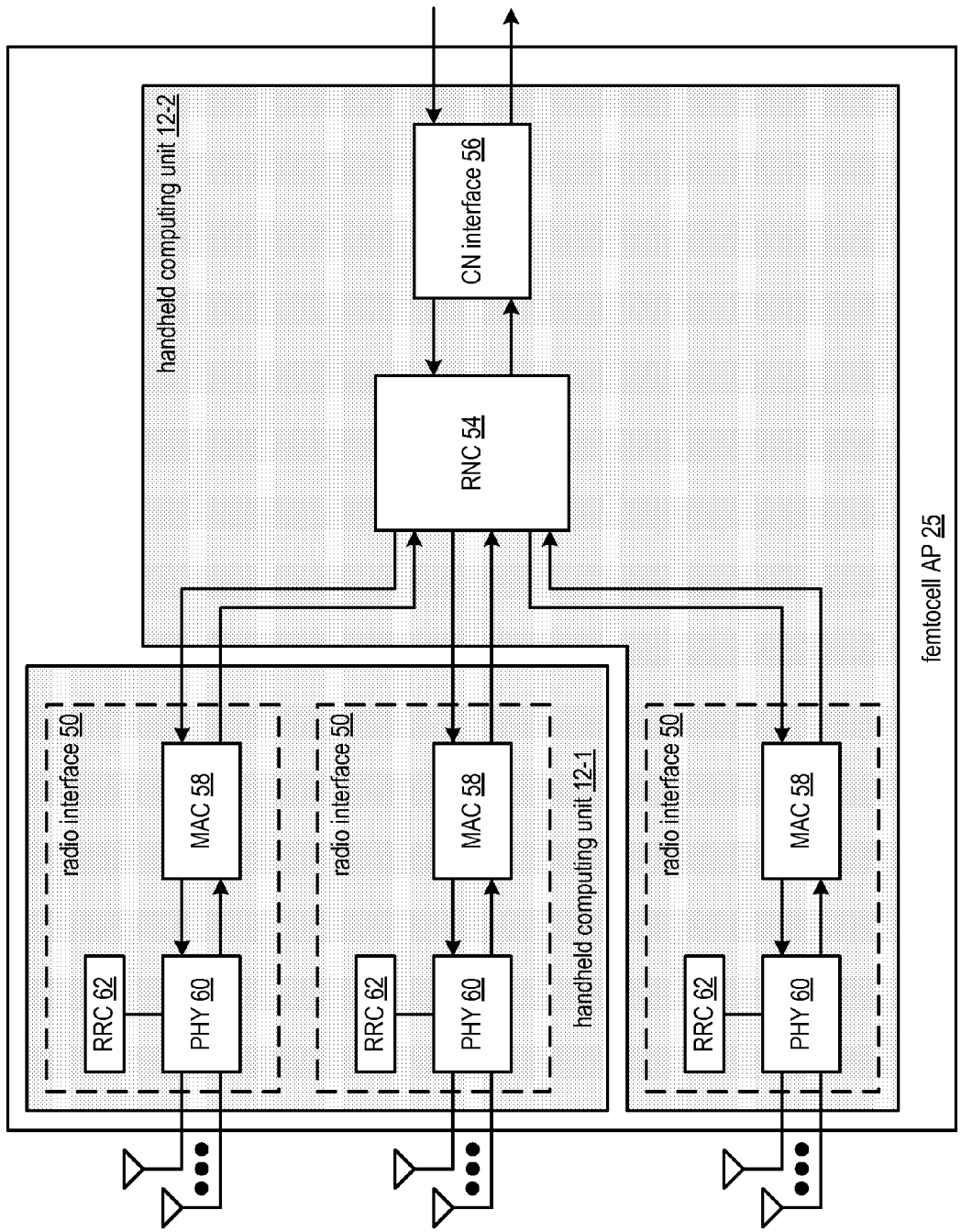
FIG. 6 is a schematic block diagram of another embodiment of multiple handheld computing units implementing a femtocell AP in accordance with the present invention.

FIG. 6 is a schematic block diagram of another embodiment of multiple handheld computing units 12-1 and 12-2 implementing a femtocell AP where the femtocell AP functions are distributed (e.g., the units are in the distributed femtocell AP implementation mode or the master device indicated that operations and/or functions would be shared). In this example, the HH computing unit 12-2 performs the CN interface operation 56, the RNC operation 54, the MAC function 58 for one of the radio interfaces, and the RRC function for the radio interface. The HH computing unit 12-1 performs the MAC functions 58 and the RRC functions for the other radio interfaces.

This is just one example of how the HH computing units 12-1 through 12-2 can share the femtocell AP operations and/or functions. Further, the sharing of the femtocell AP operations and/or functions may be achieved when the units are in a distributed implementation mode or a master/slave implementation mode. For instance, any one of the HH computing units 12-1 and 12-2 may perform 0 to 100% of the functions of a given femtocell AP operation. For example, HH computing unit 12-1 may perform 30% of the functions of the RNC 54 operation and HH computing unit 12-2 may perform the remaining 70% of the functions of the RNC 54 operation. In another example, HH computing unit 12-1 may perform 100% of the MAC 58 functions of the MAC operation for each of the radio interfaces.

The HH computing units 12-1 and 12-2 utilize the local wireless interface 33 to communicate signaling information to execute the distributed femtocell AP functions. For example, the HH computing unit 12-1 may utilize its local wireless interface 33 to communicate signaling information (e.g., DS RI signal 82, US RI signal 70) between one of its MAC 58 functions and the RNC 54 function (in HH computing unit 12-2) via the local wireless interface 33 of the HH computing unit 12-2.

The HH computing units 12-1 and 12-2 also utilize the local wireless interface 33 to communicate distribution information to coordinate the initial distribution and/or re-distribution of femtocell AP functions. The distribution information may include one or more of active/inactive femtocell AP mode, requests for changes to functionality distribution, responses to requests, HH computing unit status heartbeat (e.g., to tell others it is still operational), and/or distribution status of the distribution of functionality. The HH computing units 12-1 and 12-2 may determine to re-distribute the functions based on a time interval, a command from one of the HH computing units, as a result of user equipment 38-40 entering or leaving the area, as a result of a new HH computing unit 10 entering the area, or as a result of one of the current HH computing unit(s) leaving the area.

Figure 7:
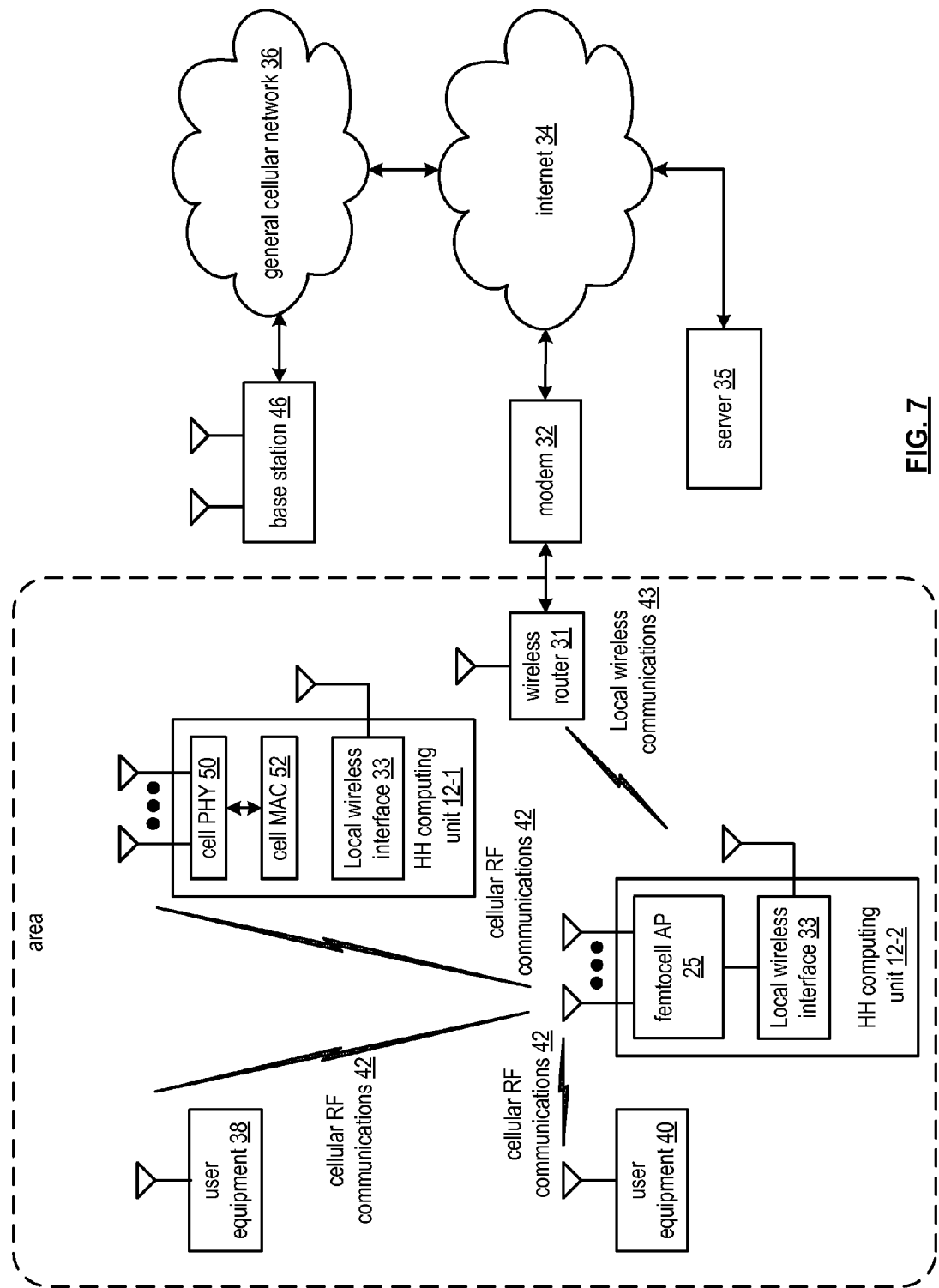
FIG. 7 is a schematic block diagram of another embodiment of multiple handheld computing units implementing a femtocell AP in accordance with the present invention.

FIG. 7 is a schematic block diagram of another embodiment of multiple handheld computing units 12-1 and 12-2 in a master/slave implementation mode. In this example, handheld computing unit 12-2 is functioning as the master femtocell AP and is fully executing the femtocell AP operations of the CN interface, the RNC operation, the RRC operation, and the MAC operation. As such, the other HH computing unit 12-1 is in a cell mode and, with respect to the master unit 12-2, is another user equipment. As previously discussed, the master unit 12-2 may off-load femtocell AP operations and/or functions to the other HH computing unit 12-1.

Figure 8:
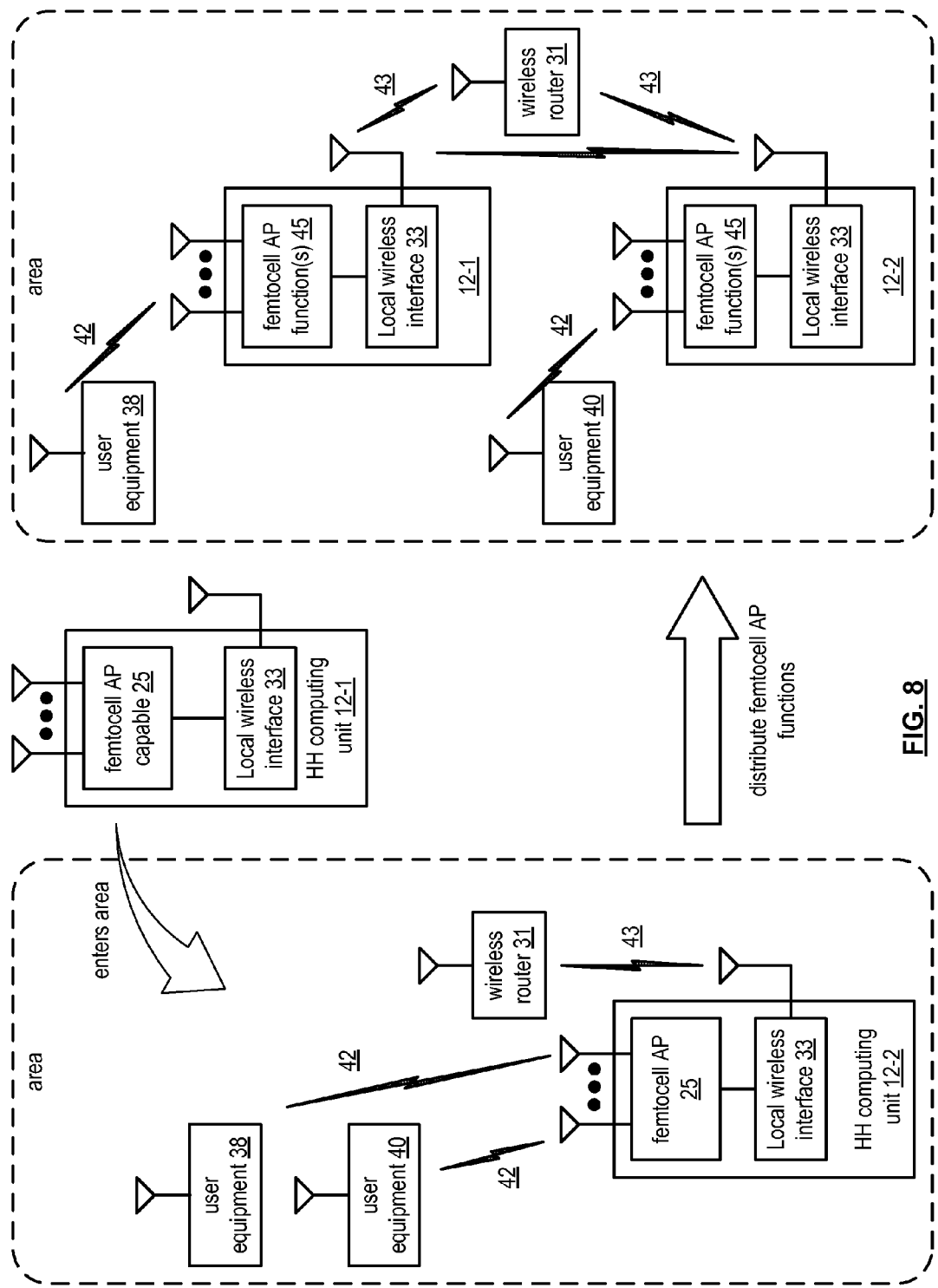
FIG. 8 is a schematic block diagram of another embodiment of multiple handheld computing units implementing a femtocell AP in accordance with the present invention.

FIG. 8 is a schematic block diagram of another embodiment of multiple handheld computing units 12-1 and 12-2, in a distributed mode, implementing a femtocell AP in an area. The diagram of the area on the left illustrates the femtocell AP status just before HH computing unit 12-1 enters the area. The diagram of the same area on the right illustrates the femtocell AP status after the femtocell AP functionality is redistributed to utilize HH computing unit 12-1. In this scenario, when HH computing unit 12-1 enters the area, it communicates with HH unit 12-2 to coordinate re-distribution of the femtocell AP operations and/or functions. For instance, the units may access a predetermined distribution of femtocell AP operations and/or functions when two units are active.

Alternatively, the units may communicate 43 to determine how the femtocell AP operations and/or functions are to be distributed. For example, the units may determine the distribution based on a quality of service basis to a user device (e.g., coverage, channel rates), available power (e.g., battery life of a HH computing unit), available processing resources (e.g., one HH computing unit may not have the correct RF resources in the femtocell AP 25 function to serve a particular class of user devices), available capacity of the local wireless communications 43 path to the general cellular network 36 via the wireless router 31 and modem 32, and/or any other factor that address efficiency and performance of the femtocell operations.

Figure 9:
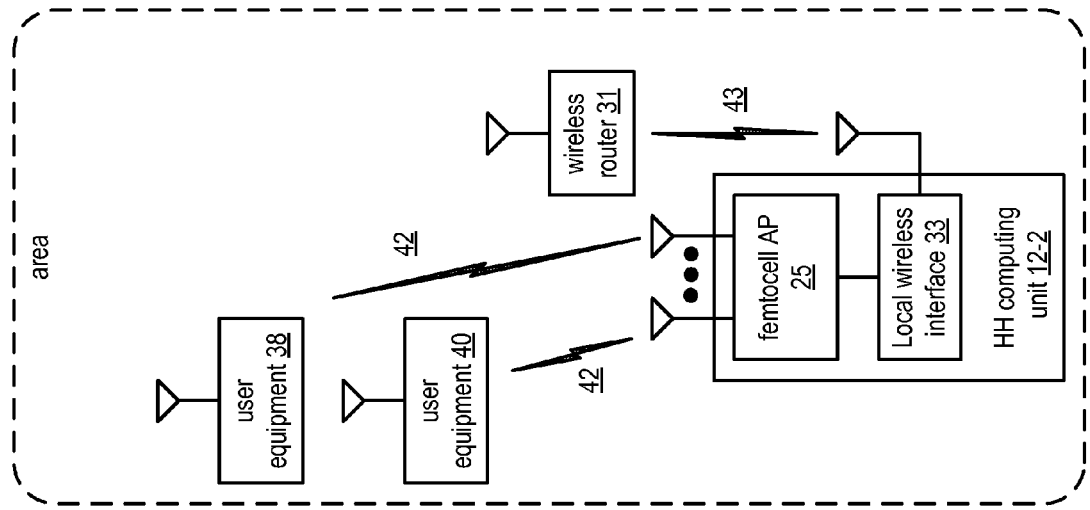
FIG. 9 is a schematic block diagram of another embodiment of multiple handheld computing units implementing a femtocell AP in accordance with the present invention.
Figure 9:
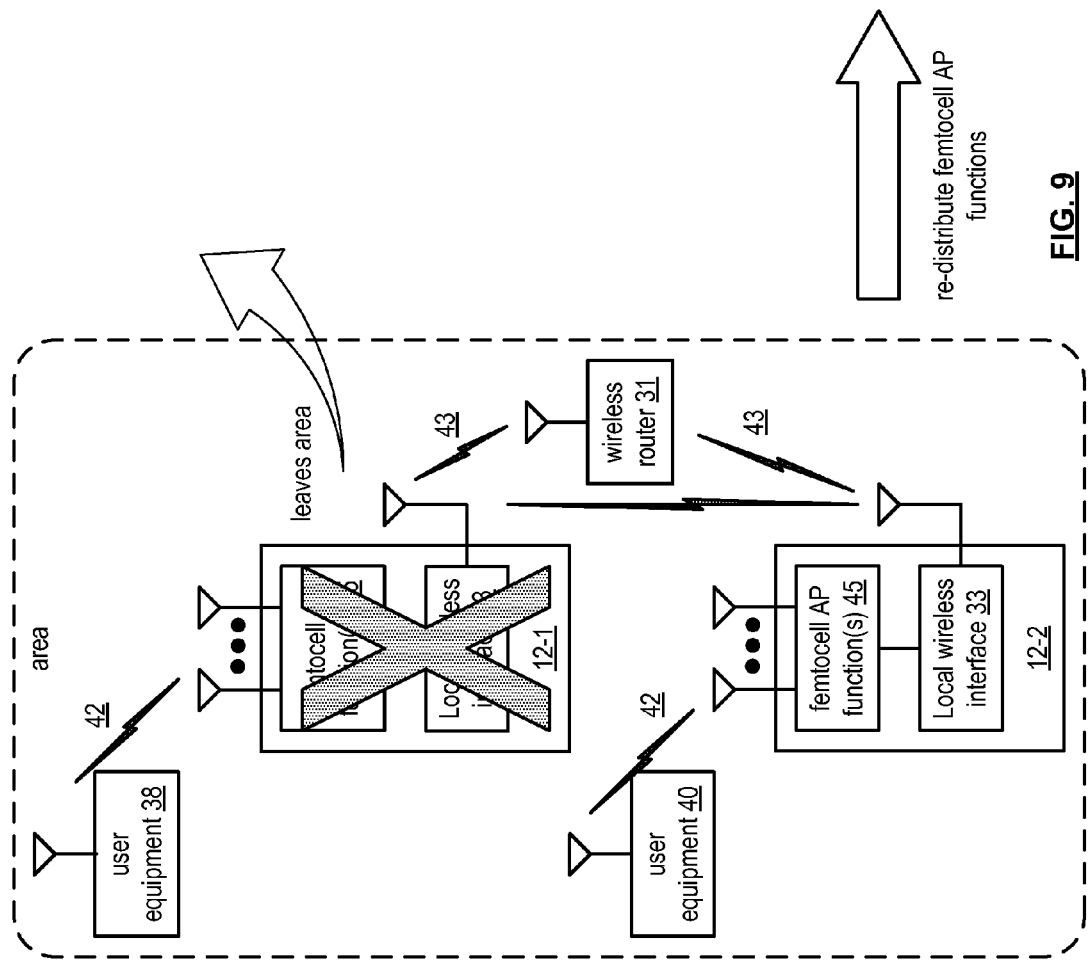

FIG. 9 is a schematic block diagram of another embodiment of multiple handheld computing units 12-1 and 12-2 implementing a femtocell AP in an area in the distributed mode. The diagram of the area on the left illustrates the femtocell AP status just before HH computing unit 12-1 leaves the area or transitions to the inactive state (unable to perform its femtocell AP operations and/or functions because it is physically leaving the area, is running out of power, or has a processing resource failure). The diagram of the same area on the right illustrates the femtocell AP status after the femtocell AP functionality is redistributed where HH computing unit 12-2 transitions from supporting some to supporting all the femtocell AP functionality for the area.

While the diagram of FIG. 9 includes only two HH computing units, if there were more that two units supporting the femtocell AP 25 and one unit left the area, the others would re-distribute the femtocell AP operations and/or functions based on a predetermined allocation of functions for a given number of units or would determine how to distribute the operations and/or functions as previously discussed.

Figure 10:
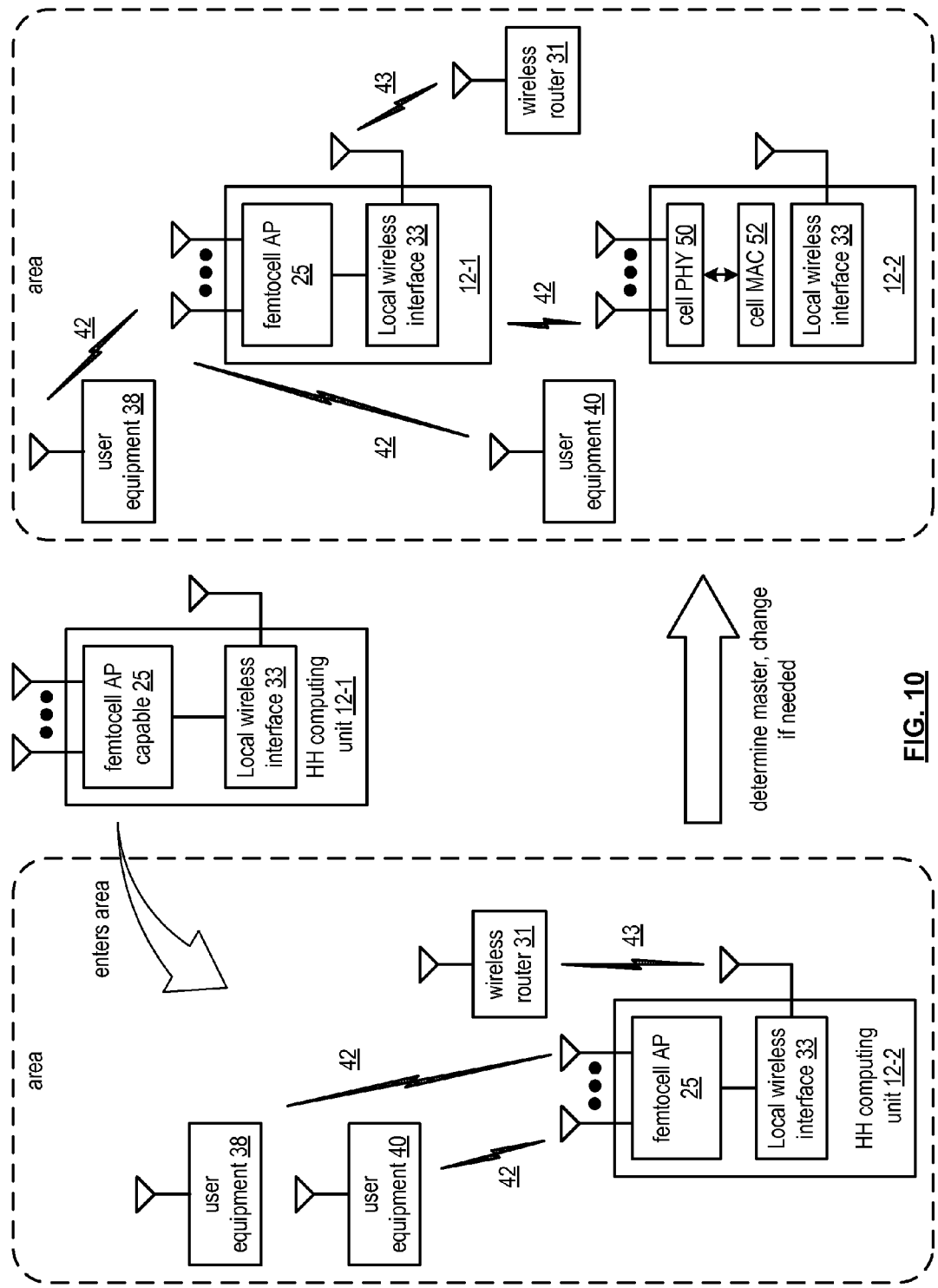
FIG. 10 is a schematic block diagram of another embodiment of multiple handheld computing units implementing a femtocell AP in accordance with the present invention.

FIG. 10 is a schematic block diagram of another embodiment of multiple handheld computing units 12-1 and 12-2 implementing a master/slave mode femtocell AP in an area. The diagram of the area on the left illustrates the femtocell AP status just before HH computing unit 12-1 enters the area. The diagram of the same area on the right illustrates the femtocell AP status after the femtocell AP functionality is redistributed to utilize HH computing unit 12-1. In the illustrated scenario, HH computing unit 12-1 becomes the new active master femtocell AP and HH computing unit 12-2 becomes an inactive but femtocell AP operating as user equipment (e.g., cell phone mode).

HH computing unit 12-1 enters the area and establishes communications 43 with HH computing unit 12-2 which is the active master femtocell AP to determine the femtocell AP mode from the distribution information. The HH computing unit 12-2 may transmit a request message to HH computing unit 12-1 to perform all or a portion of the femtocell AP functionality in the area. For example, the request message may request that HH computing unit 12-1 provide all communications 42 to user equipment 38-40, and to HH computing unit 12-2. In this instance, the HH computing unit 12-2 may have a low battery issue requiring HH computing unit 12-2 to cease femtocell AP functions in the redistribution of femtocell AP functionality.

The HH computing unit 12-1 may transmit a response to the request message to the HH computing unit 12-2 indicating that it is capable of supporting the requested femtocell AP functions. The HH computing unit 12-1 femtocell AP functions 45 establish the requested femtocell AP functions to provide communications to user equipment 38-40, and to HH computing unit 12-2. The HH computing unit 12-1 local wireless interface 33 establishes communications with the wireless router 31 as required by its femtocell AP functions. For example, where only one CN interface 56 exists in the area within the HH computing unit 12-1 then the HH computing unit 12-1 establishes communications directly through the wireless router 31 via the local wireless communications 43 with the general cellular network 36.

Figure 11:
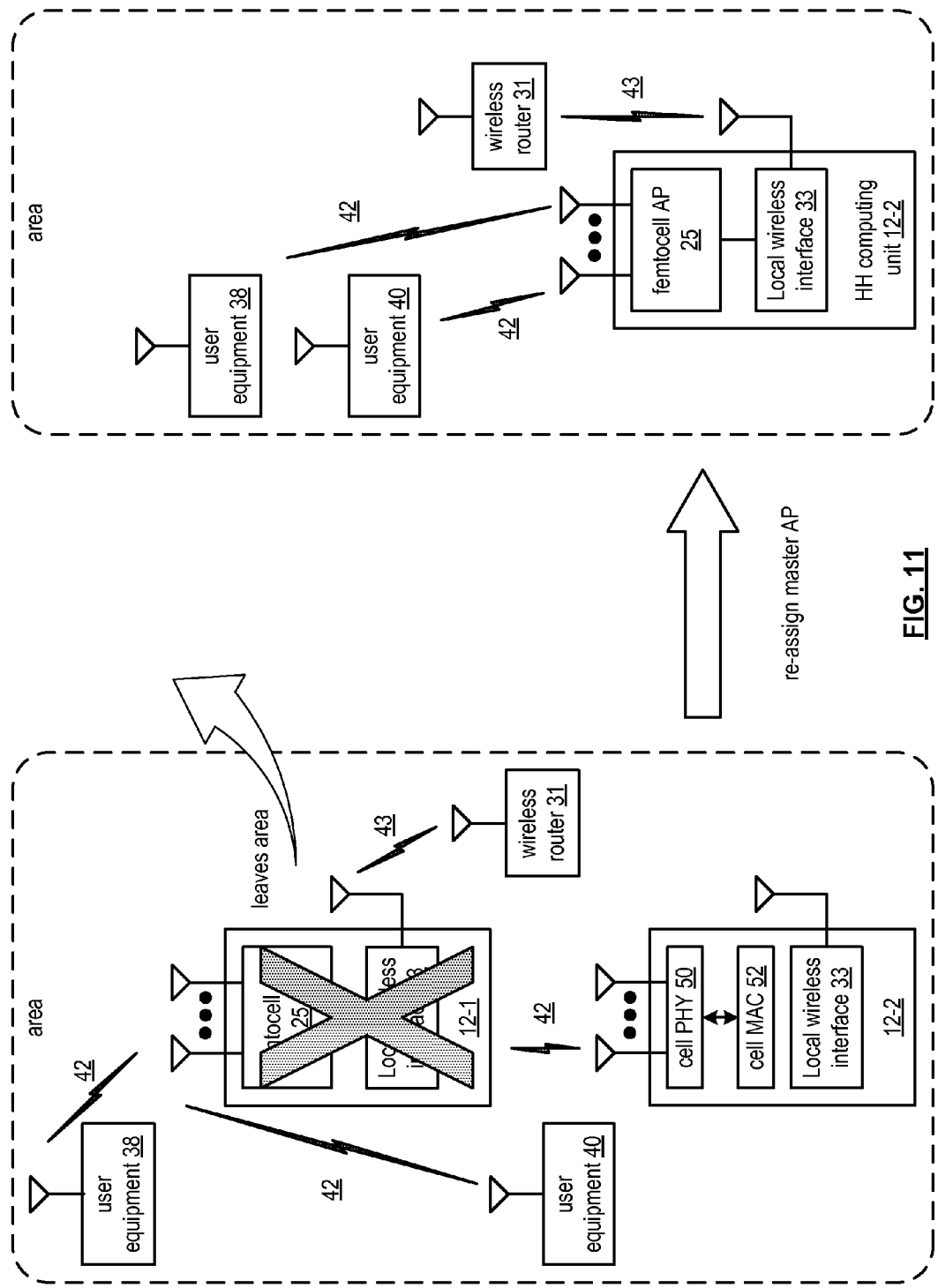
FIG. 11 is a schematic block diagram of another embodiment of multiple handheld computing units implementing a femtocell AP in accordance with the present invention.

FIG. 11 is a schematic block diagram of another embodiment of multiple handheld computing units 12-1 and 12-2 implementing a master/slave mode femtocell AP in an area.

The diagram of the area on the left illustrates the femtocell AP status just before active master femtocell AP HH computing unit 12-1 leaves the area or transitions to the inactive master non-slave mode femtocell AP state such that it is not assisting in femtocell AP functions. The diagram of the same area on the right illustrates the femtocell AP status after the femtocell AP functionality is redistributed where HH computing unit 12-2 transitions from supporting none to all of the femtocell AP functionality for the area.

HH computing units detect when there will be or has been a master capable femtocell AP state transition. HH computing units determine how to redistribute femtocell AP functionality based on the nature of the change causing the femtocell AP state transition. The HH computing units may detect that there will be or has been a master capable femtocell AP state transition in one or more ways as previously discussed with reference to FIG. 9. The HH computing units determine redistribution to optimize serving the user equipment while meeting HH computing unit needs as previously discussed with reference to FIG. 5. The new state may involve one or more HH computing units providing femtocell AP functionality.

In an example of operation, sole active master HH computing unit 12-1 has been providing femtocell AP functionality to user equipment 38-40 and master capable (but inactive) HH computing unit 12-2 operating in a user equipment (e.g., cell phone) mode. HH computing unit 12-1 starts to move out of the area. HH computing unit 12-1 signals via 43 to the other master capable HH computing unit 12-2 that HH computing unit 12-1 is about to leave the area so redistribution of femtocell AP functionality in the area is required. HH computing unit 12-2 detects the transition and determines a redistribution of femtocell AP functionality where HH computing unit 12-2 provides all of the femtocell AP functionality since it is the only master capable HH computing unit left in the area. A potentially different redistribution plan may result if there were more than one master capable HH computing units in the area. HH computing unit 12-2 executes the redistribution and now provides femtocell AP functionality to user equipment 38-40.

Figure 12:
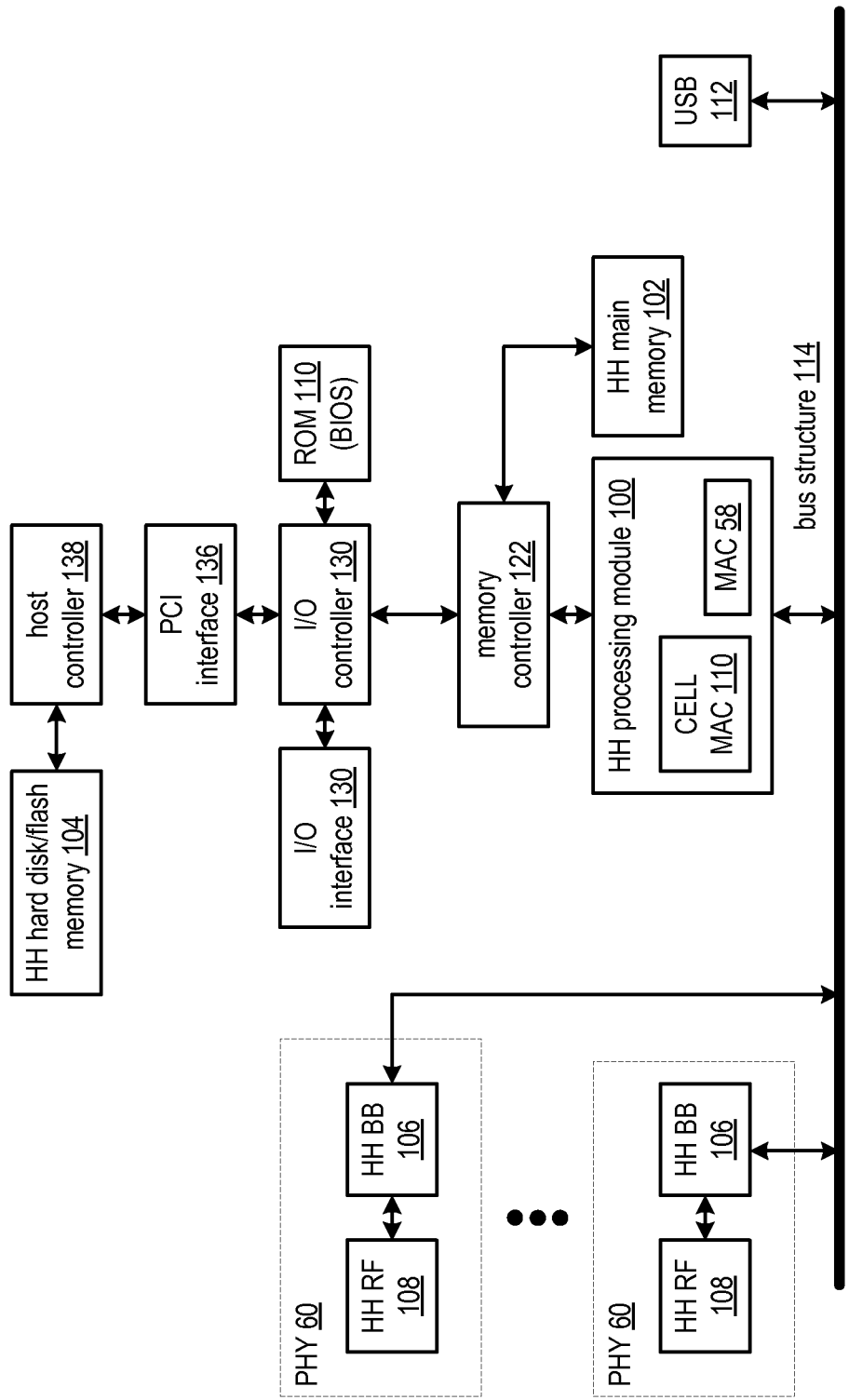
FIG. 12 is a schematic block diagram of another embodiment of a handheld computing unit in accordance with the present invention.

FIG. 12 is a schematic block diagram of another embodiment of a handheld computing unit 12 including a HH processing module 100, a HH main memory 102, a HH hard disk/flash memory 104, a plurality of PHY units 60 (e.g., a plurality of handheld baseband processing modules 106 and a plurality of handheld RF sections 108), a ROM 110, a universal serial bus (USB) interface 112, a bus structure 114, a memory controller 122, a I/O controller 130, a host controller 138, and a peripheral component interconnect (PCI) interface 136

The HH processing module 100 may include a CELL MAC 110 function and the MAC 58 function to enable the HH computing unit for function as a femtocell AP 25 or as a cell phone. In an embodiment, the HH processing module 100 utilizes the CELL MAC 110, one of the HH BB 106, one of the HH RF 108 to provide cellular RF communications 42 (e.g., like a user equipment) in a cellular mode such that the HH unit 12 provides cellular functions and other functions as discussed in the above referenced parent patent application. In another embodiment, the HH processing module 100 utilizes the MAC 58, one of the HH BB 106, one of the HH RF 108 to provide cellular RF communications 42 in a femtocell AP mode such that the HH unit 12 functions as previously discussed to provide a femtocell AP 25.

Figure 13:
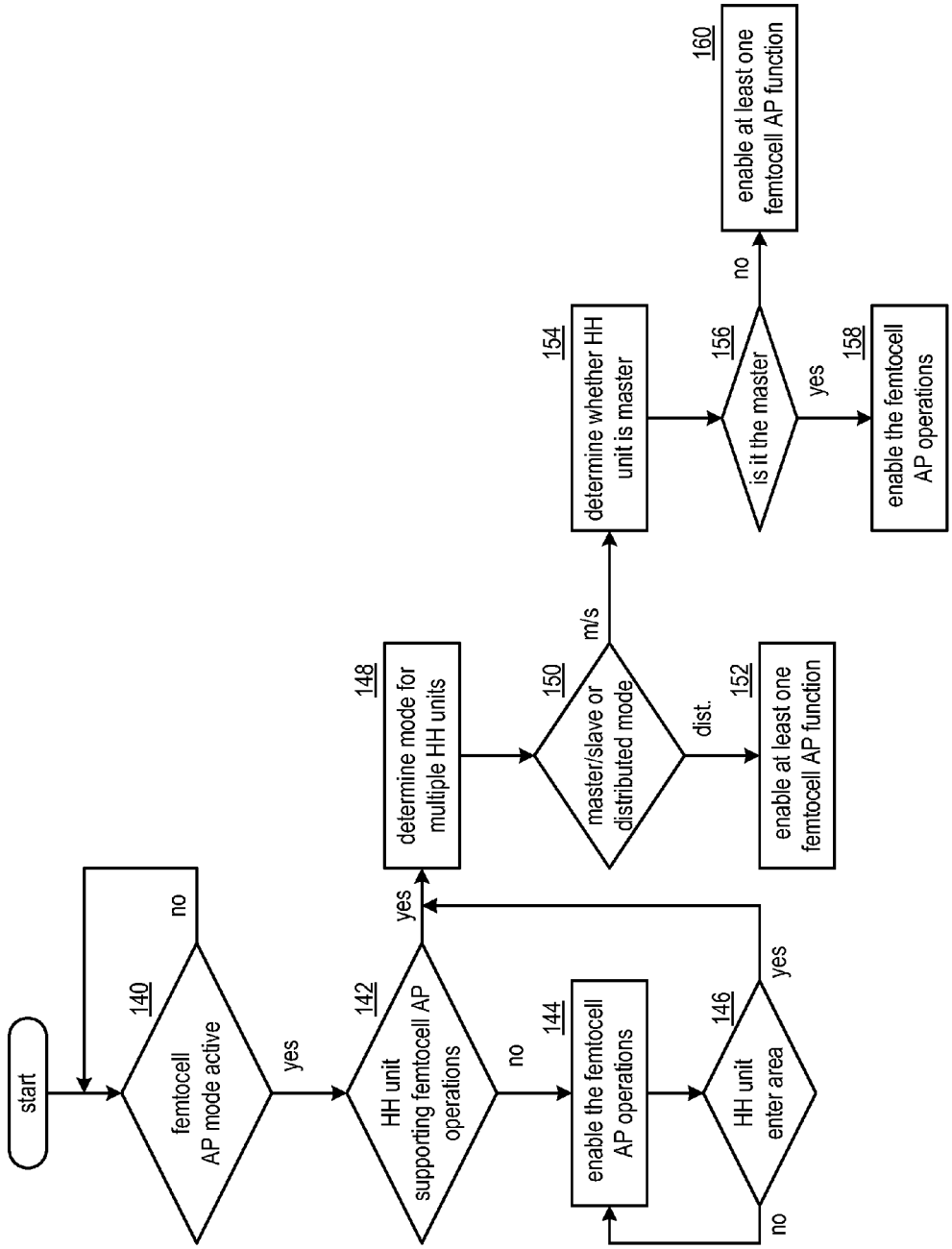
FIG. 13 is a logic diagram of an embodiment of a method for femtocell operation in accordance with the present invention.

FIG. 13 is a logic diagram of an embodiment of a method for femtocell operation that begins at step 140 where the processing module 100 determines whether a femtocell access point (AP) mode is active. The method branches to step 142 if the processing module 100 determines that the femtocell access point (AP) mode is active.

The processing module 100 may determine whether the femtocell access point (AP) mode is active by one or more of detecting an absent or a weak signal from the base station 46 in a geographic area designated for cellular service, receiving a signal from a base station transmitted a radio frequency (RF) signal indicating that the femtocell AP mode is active for the geographic area designated for cellular service, receiving a second signal in a signal via the network from a core network indicating that the femtocell AP mode is active for the geographic area designated for cellular service, and/or automatically determining that the femtocell AP mode is active when the handheld computing unit is coupled to an extended computing unit.

At step 142, the processing module 100 determines whether at least one other handheld computing unit is supporting femtocell AP operations. The processing module 100 communicates the distribution status via local wireless communications 43 with other HH computing units in the area. The processing module 100 determines whether at least one other handheld computing unit is supporting femtocell AP operations based on the distribution status. The method branches to step 148 if the processing module 100 determines that at least one other handheld computing unit is supporting femtocell AP operations. The method continues to step 144 if the processing module 100 determines that at least one other handheld computing unit is not supporting femtocell AP operations.

At step 144, the processing module 100 enables the femtocell AP operations. The femtocell AP operations includes the functions of one or more of the core network (CN) interface 56, the radio resource controller (RRC) 62, a radio network controller (RNC) 54, the plurality of radio interface medium access control (MAC) units 58, and the plurality of physical layer (PHY) units 60. The femtocell AP operations includes converting the downstream control network (CN) signal from the general cellular network into at least one downstream physical layer (PHY) signal. The PHY unit of the plurality of PHY units converts one of the at least one downstream PHY signal into a downstream radio frequency (RF) signal for transmission to user equipment 38-40. The PHY unit of the plurality of PHY units converts an upstream RF signal from user equipment 38-40 into one of the at least one upstream PHY signals. The femtocell AP operations also includes converting at least one upstream PHY signal into an upstream CN signal which is communicated to the general cellular network 36.

The radio resource controller (RRC) functions may include one or more of broadcasting information related to non-access stratum, broadcasting information related to access stratum, processing of an RRC connection, processing of radio bearers, processing radio resources for the RRC connection, performing RRC connection mobility functions, controlling requested quality of service, power control, processing initial cell selection and cell re-selection, arbitration of the radio resources on an uplink dedicated channel, RRC message integrity protection, cell broadcast service control, and/or multimedia broadcast multicast service control.

The method continues at step 146 where the processing module 100 determines if another HH computing unit 12 has entered or become active in the area. HH computing units communicate with each other via local wireless communicates 43 to exchange distribution status information. The femtocell capable HH computing unit 12 that enters a new area will communicate its availability in a distribution status message. The method branches to step 148 when the processing module 100 determines that another HH computing unit 12 has entered or become active in the area based on the distribution status message.

At step 148, the processing module 100 determines the femtocell AP operations implementation mode for multiple handheld computing units. The mode may be distributed (e.g., two or more HH computing units determine how to share the femtocell AP functionality) or master/slave where a first HH computing unit is the master (e.g., making all of the mode determinations) and the other computing unit(s) are slaves (e.g., performing at least one femtocell AP function for the master). The processing module 100 may determine the femtocell AP operations implementation mode for multiple handheld computing units based on one or more of HH computing unit capability, user equipment femtocell requirements, and performance goals as previously discussed.

At step 150, the method branches to step 154 if the processing module 100 determines that the femtocell AP operations implementation mode for multiple handheld computing units is master/slave. The method continues to step 152 if the processing module 100 determines that the femtocell AP operations implementation mode for multiple handheld computing units is distributed.

At step 152, the processing module 100 enables at least one femtocell AP function in accordance with the femtocell AP operations implementation mode when the femtocell AP operations implementation mode is distributed.

At step 154, the processing module 100, determines if the handheld computing unit is master, when the femtocell AP operations implementation mode is master/slave, based on the femtocell AP operations implementation mode. The method branches at step 156 to step 160 when the processing module 100 determines that the handheld computing unit is not the master. The method continues to step 158 when the processing module 100 determines that the handheld computing unit is the master. At step 158, the processing module 100 enables the femtocell AP operations when the handheld computing unit is the master. The processing module 100 may transmit a request to one or more HH computing units to provide at least one femtocell AP function as a slave in accordance with the femtocell AP operations implementation mode.

At step 160, the processing module 100 receives the request from the master to provide at least one femtocell AP function when the handheld computing unit 12 is not the master. The processing module 100 enables the at least one femtocell AP function in accordance with the femtocell AP operations implementation mode.

Figure 14:
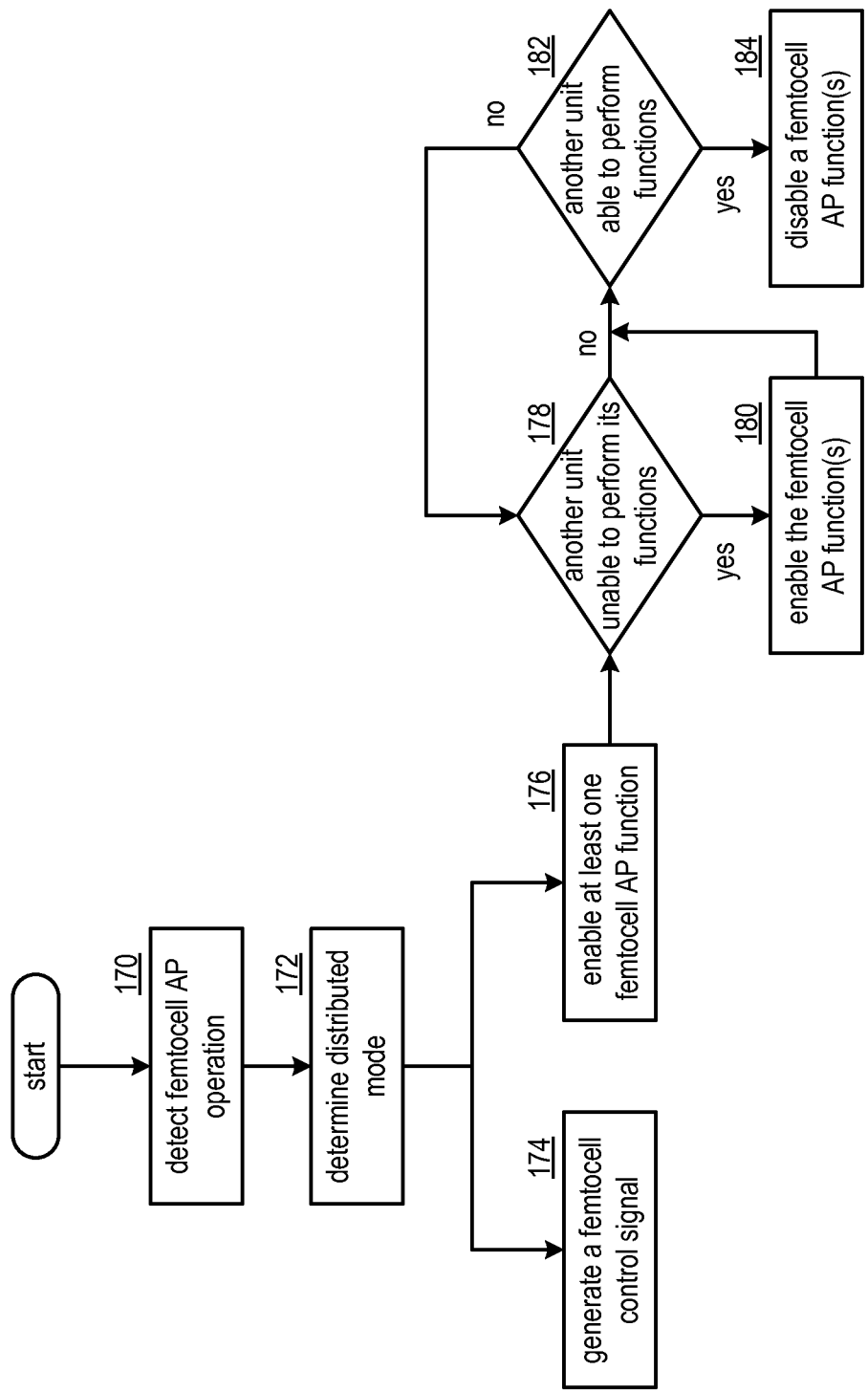
FIG. 14 is a logic diagram of another embodiment of a method for femtocell operation in accordance with the present invention.

FIG. 14 is a logic diagram of another embodiment of a method for femtocell operation that begins at step 170 where the processing module 100 detects femtocell access point (AP) operation based on a femtocell AP signal. The femtocell AP signal may include one or more of the second femtocell control signal, an assignment message (e.g., from any other processing unit), a beacon signal indicating the femtocell AP operation, the upstream physical layer (PHY) signal, and/or the downstream PHY signal.

At step 172, the processing module 100 determines the femtocell AP operations implementation mode based on one or more of the femtocell AP signal, by receiving a mode indication signal (e.g., from another HH computing unit), and receiving the response to the query message. For example, a mode indication signal is transmitted by other HH computing units from time to time as an RF mode signal to indicate the femtocell AP operations implementation mode. The local wireless interface or PHY unit provides the mode indication signal to the processing module by converting the RF mode signal into the mode indication signal. In another example, the processing module 100 contacts other HH computing units with a query message sequence to determine the femtocell AP operations implementation mode. The processing module 100 generates a query message and local wireless interface or the PHY unit converts the query message into an RF query message for transmission. The local wireless interface or PHY unit receives the response to the query message and converts the RF response message into the response and provides the response to the query message to the processing module. The query message contains the femtocell AP operations implementation mode.

At step 174 the processing module 100 generates a femtocell control signal in accordance with at least one femtocell AP function to indicate the femtocell AP operations implementation mode to other HH computing units. The processing unit 100 may send the femtocell control signal message from time to time via the PHY units or local wireless interface. The time between message transmissions may be one or a set time period, based on how often HH computing units enter or leave the area, and/or or another factor to accommodate system changes. The femtocell control signal may also be sent in response to a query from another HH computing unit.

At step 176, the processing module 100 enables at least one femtocell AP function in accordance with the femtocell AP operations implementation mode when the femtocell AP operations implementation mode is distributed based on the femtocell AP operations mode. In an embodiment, the at least one femtocell AP function may include the core network (CN) interface 56, the radio resource controller (RRC) 62, a radio network controller (RNC) 54, the plurality of radio interface medium access control (MAC) units 58, the plurality of physical layer (PHY) units 60, and the local wireless interface 31.

The femtocell AP operations includes the local wireless interface or the PHY unit of the plurality of PHY units converting the femtocell control signal into a downstream RF femtocell control signal for transmission to other HH computing units. The local wireless interface or the PHY unit of the plurality of PHY units converts an upstream radio frequency (RF) femtocell AP signal into the femtocell AP signal. For example, one HH computing unit communicates with another HH computing unit.

In another embodiment, the femtocell AP operations includes accessing a predetermined distributing mapping of femtocell AP functions for a given number of handheld computing units (e.g., predetermined assignments), utilizing a coordinated communication protocol for the given number of handheld computing units to determine a distribution of the femtocell functions (e.g., communicate the same messaging protocol to establish femtocell AP operations), and interpreting the femtocell AP signal to determine the at least one femtocell AP function (e.g., matching needs to capability).

At step 178, the processing module 100 detects when another handheld computing unit that is configured to perform at least one other femtocell AP function is unable to perform the at least one other femtocell AP function. For example, the other HH computing unit may be low on batter power or may be leaving the area. The method branches to step 182 when the processing module 100 does not detect that another handheld computing unit that is configured to perform at least one other femtocell AP function is unable to perform the at least one other femtocell AP function. The method continues to step 180 when the processing module 100 detects that another handheld computing unit that is configured to perform at least one other femtocell AP function is unable to perform the at least one other femtocell AP function. At step 180, the processing module 100 enables at least one other femtocell AP function in accordance with a femtocell AP functions reallocation protocol. In other words, the HH computing unit will help to compensate for another HH computing unit that will no longer be providing femtocell AP functionality. The method continues to step 182.

At step 182, the processing module 100 detects when another handheld computing unit is able to perform a femtocell AP function, wherein the at least one femtocell AP functions includes the femtocell AP function. In other words, look for a way to redistribute the femtocell AP functionality even when none of the HH computing units has failed or left the area by communicating with the other HH computing units. The method branches back to step 178 when the processing module 100 detects that another handheld computing unit is not able to perform a femtocell AP function. The method continues to step 184 when the processing module 100 detects that another handheld computing unit is able to perform a femtocell AP function. For example, a HH computing unit 100 has entered the area or docked with the extending computing unit.

At step 184, the processing unit 100 disables the at least one other femtocell AP function in accordance with a femtocell AP functions reallocation protocol. In this instance, another HH computing unit will pick up that function if it is still required.

Figure 15:
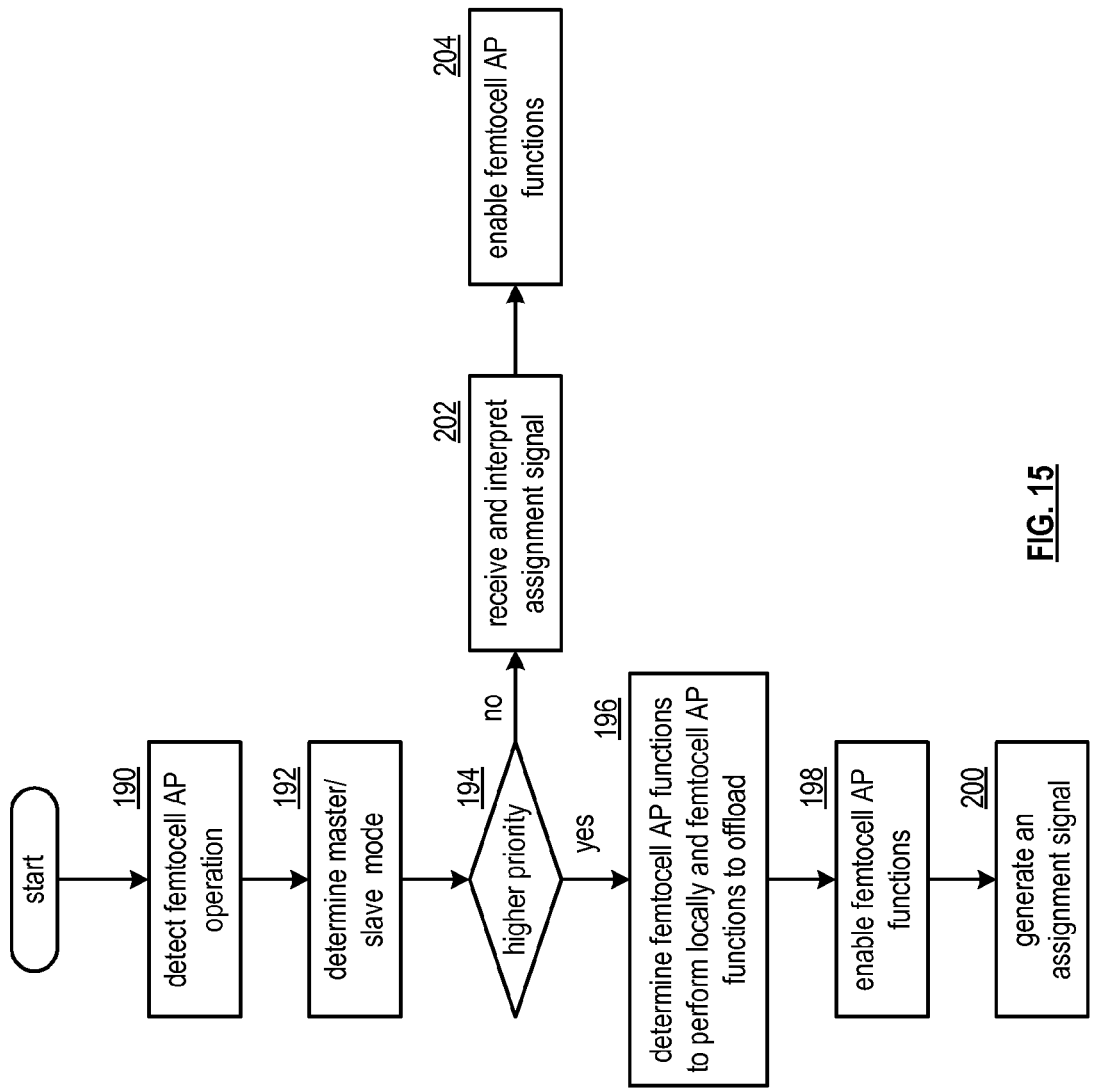
FIG. 15 is a logic diagram of another embodiment of a method for femtocell operation in accordance with the present invention.

FIG. 15 is a logic diagram of another embodiment of a method for femtocell operation that begins at step 190 where the processing module 100 detects femtocell access point (AP) operation based on the femtocell AP signal. At step 192, the processing module 100 determines the femtocell AP operations implementation mode. At step 194, when the femtocell AP operations implementation mode is master/slave, the processing module 100 determines whether the handheld computing unit is of a higher master priority than a current master. For example, a higher priority master may be predetermined or may have dynamic attributes that enable it to be a substantially better master such as better battery capacity, more PHY resources, and/or other resources. At step 194, the method branches to step 202 when the processing module determines that the handheld computing unit is not of a higher master priority than the current master. The method continues to step 196 when the processing module determines that the handheld computing unit is of a higher master priority than the current master.

At step 196, the processing module 100 determines which femtocell AP functions to perform locally and which femtocell AP functions to have performed by at least one other handheld computing unit. The femtocell AP function may include one or more of the core network (CN) interface, the radio resource controller (RRC), the radio network controller (RNC), and the plurality of radio interface medium access control (MAC) units.

The processing module 100 determines the femtocell AP functions to perform locally and the femtocell AP functions to have performed by at least one other handheld computing unit based on one or more of accessing a predetermined mapping of femtocell AP functions, querying the at least one other handheld computing unit regarding one or more user devices (e.g., to determine dynamic capabilities), querying the at least one other handheld computing unit regarding available resources (e.g., PHY resources), and/or querying the at least one other handheld computing unit regarding available power (e.g., available battery life).

In an embodiment, the outcome of the determination by the processing module 100 may determine that the handheld computing unit will perform the femtocell AP functions to support a first set of user devices and that the other handheld computing unit will perform the femtocell AP functions to support a second set of user devices, wherein a number of user devices in the second set is greater than or equal to zero.

At step 198, the processing module 100 enables the femtocell AP functions to perform locally (e.g., by the HH computing unit). At step 200, the processing module 100 generates an assignment message indicating the femtocell AP functions to be performed by the at least one other handheld computing unit. The processing module 100 passes the assignment message to either one of the plurality of physical layer (PHY) units or to the local wireless interface where the assignment message is converted into a downstream radio frequency (RF) assignment signal for transmission to the other HH computing unit.

At step 202, when the processing module determines that the handheld computing unit is not of a higher master priority than the current master, the PHY unit converts an inbound RF assignment signal into the assignment message. The processing module 100 receives the assignment message from the PHY unit and interprets the assignment message to identify at least one of the femtocell AP functions to perform. At step 204, the processing module enables the at least one of the femtocell AP functions.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A handheld computing unit that functions as a stand-alone battery operated unit comprises:
   a processing module operable coupled to:
      determine whether a femtocell access point (AP) mode is active;
      when the femtocell AP mode is active, determine whether at least one other handheld computing unit is supporting a femotcell;
      when the at least one other handheld computing unit is supporting the femtocell, enable a femtocell AP operation to utilize the handheld computing as a distributed unit to provide a femtocell AP function to support the femtocell along with the at least one other handheld computing unit, the femtocell AP operations IS distributed by at least:
         accessing a predetermined distributing mapping of the femtocell AP functions for a given number of handheld computing units;
         utilizing a coordinated communication protocol for the given number of handheld computing units to determine a distribution of the femtocell AP functions; and
         interpreting a femtocell AP signal to determine the femtocell AP function;
   a plurality of physical layer (PHY) units, wherein a PHY Unit of the plurality of PHY units is operably coupled to communicate with at least one other handheld computing unit.

2. The handheld computing unit of claim 1, wherein the processing module is further operably coupled to determine whether the femtocell AP mode is active by at least one of:
   detecting an absent or a weak signal from a base station in a geographic area designated for cellular service;
   receiving a signal indicating that the femtocell AP mode is active for the geographic area designated for cellular service, wherein the base station to transmit a radio frequency (RF) signal that includes the signal;
   receiving a second signal indicating that the femtocell AP mode is active for the geographic area designated for cellular service, wherein a core network to transmit, via a network, a network signal that includes the second signal; and
   automatically determining that the femtocell AP mode is active when the handheld computing unit is coupled to an extended computing unit.

3. The handheld computing unit of claim 1, wherein the femtocell AP operations is provided by:
   a core network (CN) interface;
   a radio resource controller (RRC);
   a radio network controller (RNC); and
   a plurality of radio interface medium access control (MAC) units.

4. The handheld computing unit of claim 1, wherein the PHY unit comprises:
   a baseband processing module operably coupled to:
      convert a downstream PHY signal into a downstream symbol stream; and
      convert an upstream symbol stream into an upstream PHY signal; and
   a radio frequency (RF) section operably coupled to:
      convert the downstream symbol stream into a downstream RF signal; and
      convert an upstream RF signal into the upstream symbol stream.

5. The handheld computing unit of claim 1 further comprises:
   a local wireless interface module operably coupled to:
      convert a downstream local network radio frequency (RF) signal into a downstream control network signal; and
      convert an upstream control network signal into an upstream local network RF signal.

6. The handheld computing unit of claim 1 further comprises:
   a docking interface coupled to at least the processing module, wherein the docking interface provides coupling of the handheld computing unit to an extended computing unit, wherein the extended computing unit includes a network interface module to:
      convert an upstream local network signal into an upstream control network signal; and
      convert a downstream control network signal into a downstream local network signal.

7. The handheld computing unit of claim 1, wherein the processing module is further operably coupled to:
   determine whether the handheld computing unit is a master, when the femtocell AP operations implementation mode is in a master/slave mode; and
   enable the femtocell AP operations for the handheld computing unit to be the master, when the handheld computing unit is determined to be the master.

8. The handheld computing unit of claim 7, wherein when the handheld computing unit is not the master, the processing module is further operably coupled to:
   receive a request from another of the at least one other handheld computing unit operating as the master to provide the femtocell AP function; and
   enable the femtocell AP function in response to the request.

9. A handheld computing unit that functions as a stand-alone battery operated unit comprises:
   a processing module operably coupled to:
      detect a femtocell access point (AP) operation for a femtocell based on a femtocell AP signal;
      determine a femtocell AP operations implementation mode enable at least one femtocell AP function in accordance with the femtocell AP operations implementation mode, when the femtocell AP operations mode is distributed, by at least one of:

accessing a predetermined distributed mapping of femtocell AP functions for a given number of handheld computing units;

utilizing a coordinated communication protocol for the given number of handheld computing units to determine a distribution of the femtocell AP functions; and interpreting the femtocell AP signal to determine the at least one femtocell AP function;

generate a femtocell control signal in accordance with the at least one femtocell AP function;

a plurality of physical layer (PHY) units operable coupled to the processing module; and a local wireless interface module, wherein the local wireless interface module or one of the plurality of PHY units is operable coupled to transfer the femtocell control signal.

10. The handheld computing device of claim 9, wherein the femtocell AP signal comprises at least one of:
a second femtocell control signal;
an assignment message;
a beacon signal indicating the femtocell AP operation;
an upstream physical layer (PHY) signal; and
a downstream PHY signal.

11. The handheld computing device of claim 9, wherein the processing module determines femtocell AP operations implementation mode by at least one of:
the femtocell AP signal;
receiving a mode indication signal; and
receiving a response to a query message.

12. The handheld computing unit of claim 9, wherein the at least one femtocell AP function is to be provided by:
a core network (CN) interface;
a radio resource controller (RRC);
a radio network controller (RNC); and
a plurality of radio interface medium access control (MAC) units.

13. The handheld computing unit of claim 9, wherein the processing module is operably coupled to:
detect when another handheld computing unit that is configured to perform at least one other femtocell AP function is unable to perform the at least one other femtocell AP function; and
enable the at least one other femtocell AP function in accordance with a femtocell AP functions reallocation protocol.

14. The handheld computing unit of claim 9, wherein the processing module is operably coupled to:
detect when another handheld computing unit is able to perform the femtocell AP function; and
disable the at least one other femtocell AP function in accordance with a femtocell AP functions reallocation protocol.

15. A handheld computing unit that functions as a stand-alone battery operated unit comprises:
a processing module operably coupled to:
detect a femtocell access point (AP) operation for a femtocell based on a femtocell AP signal;
determine a femtocell AP operations implementation mode;
determine whether the handheld computing unit is of a higher master priority than a current master, when the femtocell AP operations implementation mode is in a master/slave mode;
determine which femtocell AP functions to perform locally and which femtocell AP functions to have performed by at least one other handheld computing unit, when the handheld computing unit has a higher master priority, by at least one of:
accessing a predetermined mapping of femtocell AP functions;
querying the at least one other handheld computing unit regarding one or more user devices;
querying the at least one other handheld computing unit regarding available resources; and
querying the at least one other handheld computing unit regarding available power;
enable the femtocell AP functions to perform locally;
generate an assignment message indicating the femtocell AP functions to be performed by the at least one other handheld computing unit; and
a plurality of physical layer (PHY) units operably coupled to the processing module; and
a local wireless interface module, wherein the local wireless interface module or one of the plurality of PHY units is operably coupled to transfer the assignment message.

16. The handheld computing unit of claim 15, wherein the femtocell AP functions are provided by:
a core network (CN) interface;
a radio resource controller (RRC);
a radio network controller (RNC); and
a plurality of radio interface medium access control (MAC) units.

17. The handheld computing unit of claim 15, wherein the processing module is further operably coupled to:
receive another assignment message, when the handheld computing unit is not of a higher master priority; and
interpret the another assignment message to identify the femtocell AP functions to perform locally; and
enable the femtocell AP functions to perform locally.

18. A handheld computing unit that functions as a stand-alone battery operated unit comprises:
a processing module operably coupled to:
detect a femtocell access point (AP) operation for a femtocell based on a femtocell AP signal;
determine a femtocell AP operations implementation mode;
determine whether the handheld computing unit is of a higher master priority than a current master, when the femtocell AP operations implementation mode is in a master/slave mode;
determine which femtocell AP functions to perform locally and which femtocell AP functions to have performed by at least one other handheld computing unit, when the handheld computing has a higher master priority, by:
determining that the handheld computing unit is to perform the femtocell AP functions to support a first set of user devices; and
determining that the at least one other handheld computing unit is to perform the femtocell AP functions to support a second set of user devices
enable the femtocell AP functions to perform locally;
generate an assignment message indicating the femtocell AP functions to be performed by at least one other handheld computing unit and;
a plurality of physical layer (PHY) units operably coupled to the processing module; and
a local wireless interface module, wherein the local wireless module or one of the plurality of PHY units is operably coupled to transfer the assignment message.

19. The handheld computing unit of claim 18, wherein the femtocell AP functions are provided by:
a core network (CN) interface;

a radio resource controller (RRC);
a radio network controller (RNC); and
a plurality of radio interface medium access control (MAC) units.

20. The handheld computing unit of claim 18, wherein the processing module is further operably coupled to:
receive another assignment message, when the handheld computing unit is not of a higher master priority; and
interpret the another assignment message to identify the femtocell AP functions to perform locally; and
enable the femtocell AP functions to perform locally.

* * * * *

UNITED STATES PATENT AND TRADEMARK OFFICE
CERTIFICATE OF CORRECTION

PATENT NO.         : 8,717,974 B2
APPLICATION NO.    : 12/495298
DATED              : May 6, 2014
INVENTOR(S)        : Ahmadreza Rofougaran Page 1 of 1

It is certified that error appears in the above-identified patent and that said Letters Patent is hereby corrected as shown below:

In the Claims
Col. 17, line 28, in claim 1: replace "operable" with --operably--
Col. 18, line 64, in claim 9: after "mode" insert --to--
Col. 19, line 12, in claim 9: replace "operable" with --operably--
Col. 19, line 16, in claim 9: replace "operable" with --operably--
Col. 20, line 48, in claim 18: after "handheld computing" insert --unit--
Col. 20, line 55, in claim 18: after "set of user devices" insert --;--

Signed and Sealed this
Seventeenth Day of March, 2015

Michelle K. Lee
*Director of the United States Patent and Trademark Office*